(12) United States Patent
Katre et al.

(10) Patent No.: US 11,582,322 B2
(45) Date of Patent: Feb. 14, 2023

(54) MACHINE-LEARNING APPLICATION PROXY FOR IOT DEVICES INCLUDING LARGE-SCALE DATA COLLECTION USING DYNAMIC SERVLETS WITH ACCESS CONTROL

(71) Applicant: AVAGO TECHNOLOGIES INTERNATIONAL SALES PTE. LIMITED, Singapore (SG)

(72) Inventors: Prashant Katre, San Diego, CA (US); Yong Li, San Diego, CA (US); Fabian Russo, Trabuco Canyon, CA (US); Darren Tokushige, San Diego, CA (US); Craig Arlen Detrick, San Diego, CA (US); Gary Jacob Skerl, San Diego, CA (US); Xuemin Chen, Rancho Santa Fe, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 489 days.

(21) Appl. No.: 16/670,269

(22) Filed: Oct. 31, 2019

(65) Prior Publication Data
US 2021/0136170 A1 May 6, 2021

(51) Int. Cl.
G06F 9/46 (2006.01)
H04L 67/565 (2022.01)
G06F 9/54 (2006.01)
G06F 9/50 (2006.01)

(52) U.S. Cl.
CPC .......... *H04L 67/565* (2022.05); *G06F 9/5038* (2013.01); *G06F 9/546* (2013.01)

(58) Field of Classification Search
CPC ... H04L 67/2823; G06N 20/00; G06F 9/5038; G06F 9/546
See application file for complete search history.

(56) References Cited

U.S. PATENT DOCUMENTS

| | | | |
|---|---|---|---|
| 10,685,295 B1 * | 6/2020 | Ross | G06N 20/00 |
| 10,693,813 B1 * | 6/2020 | Jacob Da Silva | H04L 43/10 |
| 11,038,910 B1 * | 6/2021 | Cheng | H04L 63/1425 |
| 2015/0379072 A1 * | 12/2015 | Dirac | G06N 20/00 |
| | | | 707/693 |
| 2018/0267884 A1 * | 9/2018 | Dhanda | G06F 11/3684 |
| 2019/0086988 A1 * | 3/2019 | He | G06F 1/3212 |

* cited by examiner

*Primary Examiner* — Diem K Cao
(74) *Attorney, Agent, or Firm* — BakerHostetler

(57) ABSTRACT

An apparatus and method for providing ML processing for one or more ML applications operating on one or more Internet of Things (IoT) devices includes receiving a ML request from an IoT device. The ML request can be generated by a ML application operating on the IoT device and include input data collected by the first ML application. A ML model to perform ML processing of the input data included in the ML request is identified and provided to an ML core for ML processing along with the input data included in the first ML request. The ML core produces ML processing output data based on ML processing by the ML core of input data included in the ML request using the ML model. The ML processing output data can be transmitted to the IoT device.

19 Claims, 19 Drawing Sheets

US 11,582,322 B2

MACHINE-LEARNING APPLICATION PROXY FOR IOT DEVICES INCLUDING LARGE-SCALE DATA COLLECTION USING DYNAMIC SERVLETS WITH ACCESS CONTROL

BACKGROUND

Field

This disclosure relates to the field of machine learning and data collection for IOT devices, components and methods.

Description of the Related Art

Machine learning (ML), among other applications of artificial intelligence, enables a system to learn and improve from experience. By providing such a benefit, machine learning has developed across innumerable applications and a wide range of systems and operations. Through machine learning, these systems can learn to operate more efficiently including using less processing time and achieving increasingly desirable results.

To ensure machine learning provides the proper improvement and efficiencies to system operations entails two primary requirements: significant volumes of data from which to learn; and significant processing power. Providing significant volumes of data to the system implementing the machine learning presents multiple difficulties. These difficulties include, for example, identifying the location of the data, collecting the data, and transmitting the data to the system implementing the machine learning. Additionally, the system receiving the data needs to know from where the data is coming and to be able to read and process the data properly.

Assuming the system implementing the machine learning can properly collect the data, the system must have the necessary processing power to handle and process the large volumes of data. Given the large volumes of data needed to obtain useful results, the necessary processing power typically involves numerous processors and substantial software to coordinate the processing of the data, the operation of the processors, and feeding back the results of the processing. The numerous processors and significant software needs make the cost of implementing machine learning quite prohibitive.

The combined requirements of collecting significant volumes of data and significant processing power thus raise considerable logistical and cost difficulties for using machine learning. It would therefore be desirable to have a system that could lessen these difficulties.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
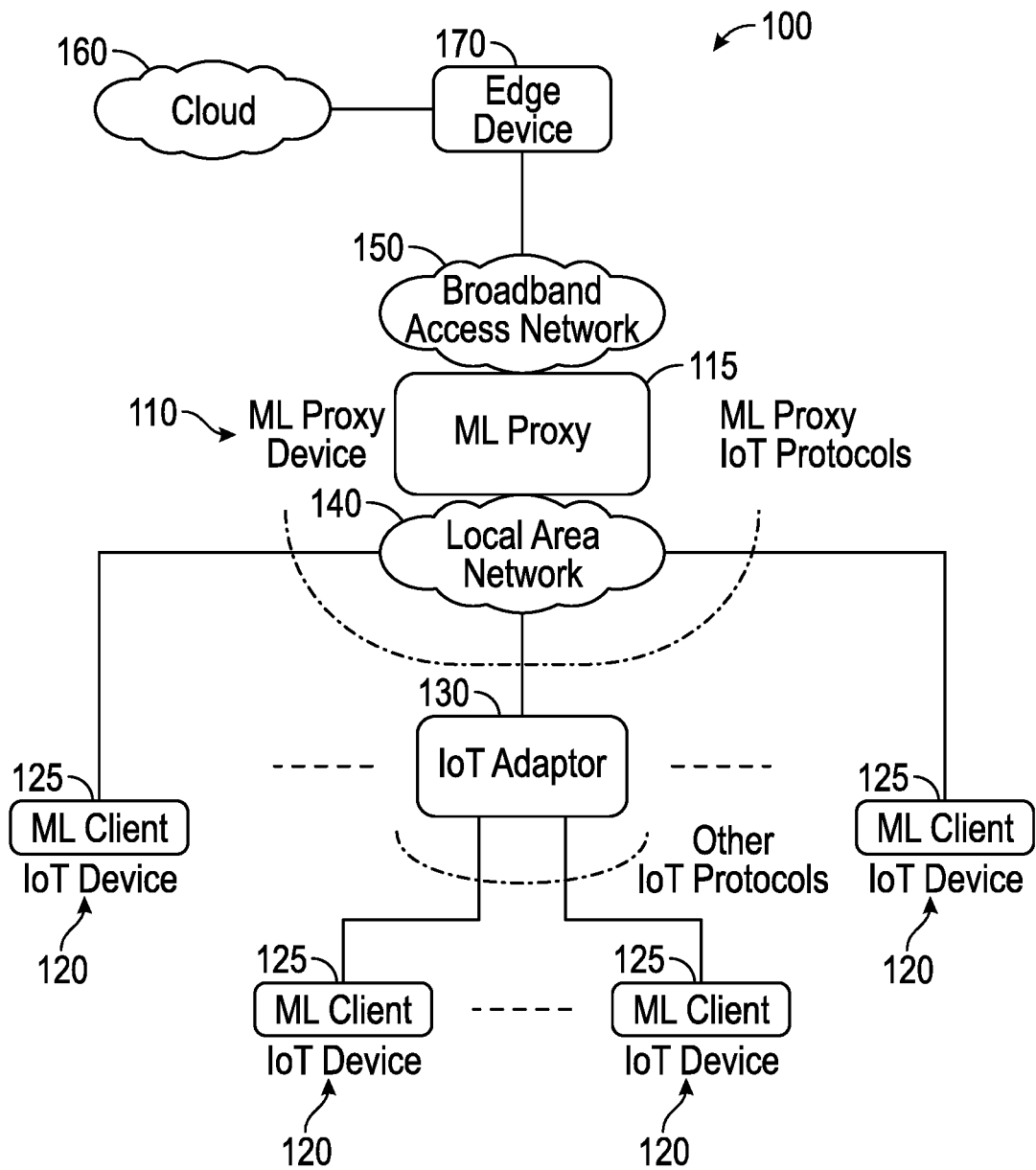
FIG. 1 illustrates an embodiment of a machine-learning (ML) proxy system according to some embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in simplified form in order to avoid obscuring the concepts of the subject technology.

In the drawings referenced herein, like reference numerals designate identical or corresponding parts throughout the several views or embodiments.

The system of FIG. 1 illustrates an embodiment of a machine-learning (ML) proxy system in which multiple Internet of Things (IoT) devices are capable of taking advantage of ML capabilities without needing to configure the IoT devices to have the programing and processing power to provide those ML capabilities. Instead, a proxy device acts for those IoT devices and provides the ML capabilities.

More specifically, FIG. 1 illustrates an embodiment of a ML proxy system in which a ML proxy device 110 is communicatively coupled to a plurality of IoT devices 120 via a local area network (LAN) 140, although communication between ML proxy device 110 and IoT devices 120 can be implemented with other technologies capable of providing a communication path between ML proxy device 110 and IoT devices 120. ML proxy device 110 can be implemented in a residential broadband gateway, such as a cable model, xDSL modem, or a xPON gateway, in the LAN 140. Alternatively, ML proxy device 110 can be implemented as a node device, such as a CMTS (cable modem termination system), RPD/RMD (remote PHY device/remote MAC/PHY device), DSLAM (digital subscriber line access multiplexer), or OLT (optical line termination), in a broadband access network 150 or other network capable of providing a high data-transmission rate Internet connection. To implement its functionality, ML proxy device 120 can be implemented in hardware, software, or a combination thereof. More specifically, ML proxy device 110 can include one or more processors, such as CPUs or ASICs, one or more memory modules, such as RAM, ROM, hard drives, optical disks, or other storage mediums, and software, such as programs, routines, operating systems, plugins, or applications. These components can be part of existing broadband gateways and node devices or supplemental to them.

IoT devices 120 can be any of a number of different types of devices including, for example, security systems, voice controllers (e.g., Amazon Echo), cameras, kitchen appliances, navigations systems, smoke and other types of detectors, air conditioners and thermostats, and sensors. This is a non-exhaustive list, and IoT devices 120 can be considered generally to include other types of devices that are capable of providing data on their operations and capable of being reconfigured in response to data received. IoT devices 120 can be used to implement various IoT applications including, for example, emotion recognition, age and gender prediction, food detection, human action prediction and detection, object movement detection, energy consumption prediction, room occupancy, and other applications as are known to those skilled in the art. Like ML proxy device 120, the functionality of IoT devices can be implemented in hardware, software, or a combination thereof, and can include one or more processors, such as CPUs or ASICs, one or more memory modules, such as RAM, ROM, hard drives, optical disks, or other storage mediums, and software, such as programs, routines, operating systems, plugins, or applications.

As further shown in FIG. 1, each IoT device 120 includes a ML client 125. ML client 125 can be a hardware or software component, such as an application or plugin, or a combination thereof residing in each IoT device, that enables the IoT Devices 120 to obtain ML-application processing by outsourcing the ML-application processing capability to ML proxy device 110. ML client 125 is preferably configured to communicate with a ML proxy 115 residing within ML proxy device 110. Like ML client 125, ML proxy 115 can be a hardware or software component, such as an application or plugin, or a combination thereof, residing within ML proxy device 110.

Instead of performing ML processing within each IoT device 120, the ML processing is provided by the ML proxy device 110. To do so, ML client 125 within each IoT device 120 collects ML input data from the applications and programming running on each IoT device 120 and sends the collected data to ML proxy 115 within ML proxy device 110 to perform ML processing. The ML input data collected and sent to the ML proxy 115 generally depends on the type of IoT device 120. For example, a security system may provide still or video images, time information, event information (e.g., alarms, resets, etc.) as the collected input data.

ML proxy 115 provides the collected input data to an ML core (discussed herein), which performs ML processing using the collected input data. The ML processing can include, for example, inference with pre-trained ML models as well as online re-training of existing ML models. After performing the ML processing, ML proxy 115 sends the ML processing output data back to the IoT device 120 that provided the collected input data. ML client 125 uses the ML processing output data to modify the operation of IoT device 120 receiving the ML processing output data. For example, if IoT device 120 is a video surveillance system, the ML processing output data can be used to improve image recognition and correspondingly improve recognition of events triggering alarms.

Communication between ML proxy device 110 and IoT devices 120 can be, for example, via one or more IoT data-link or transport protocols, such as Bluetooth or WiFi. Preferably, ML proxy device 110 and IoT devices support the same IoT data transport protocol, which ensures that each can communicate with the other properly. In the event that an IoT Device 120 supports an IoT data transport protocol different than any of the data transport protocols supported by the ML proxy device 120, an IoT adaptor can be used to enable different protocols to communicate with each other. For example, an IoT adaptor can bridge a protocol supported by IoT Device 120, such as ZigBee, with one of the protocols supported by the ML proxy device 110, such as WiFi or Bluetooth. Using these IoT data transport protocols, ML client 125 can transfer collected input data to ML proxy 115, and ML proxy 115 can transfer the ML processing output data to ML client 125.

To perform the ML processing on the input data collected by ML clients 125, ML proxy 115 can host one or more ML cores. An ML core corresponds to the processors and other hardware components for executing a particular ML model. ML models, as are known to those skilled in the art, can be configured to implement different kinds of ML processing for different types of data. For example, an ML model can be implemented to perform image recognition processing using image data received from an IoT device 120 implemented as a security system. A specific example of an ML model is a convolutional neural network (CNN), which can be used for image data, classification prediction problems, regression prediction problems, text data, time series data, and sequence input data. A CNN provides speed and accuracy, can handle large spatial dimensions with many parallel input and hidden nodes, and functions with deep temporal layers.

The ML proxy system of FIG. 1 can be configured to provide security across all of the devices, components, programming, and data. To do so, the ML proxy system can include security mechanisms for the ML Cores, the input and output data, the ML models, and the ML applications running on both the ML client 125 and ML proxy 115. The security mechanisms for providing sufficient protection to the devices, components, programming, and data of the ML proxy system can be protocols and systems known to those skilled in the art.

Figure 2:
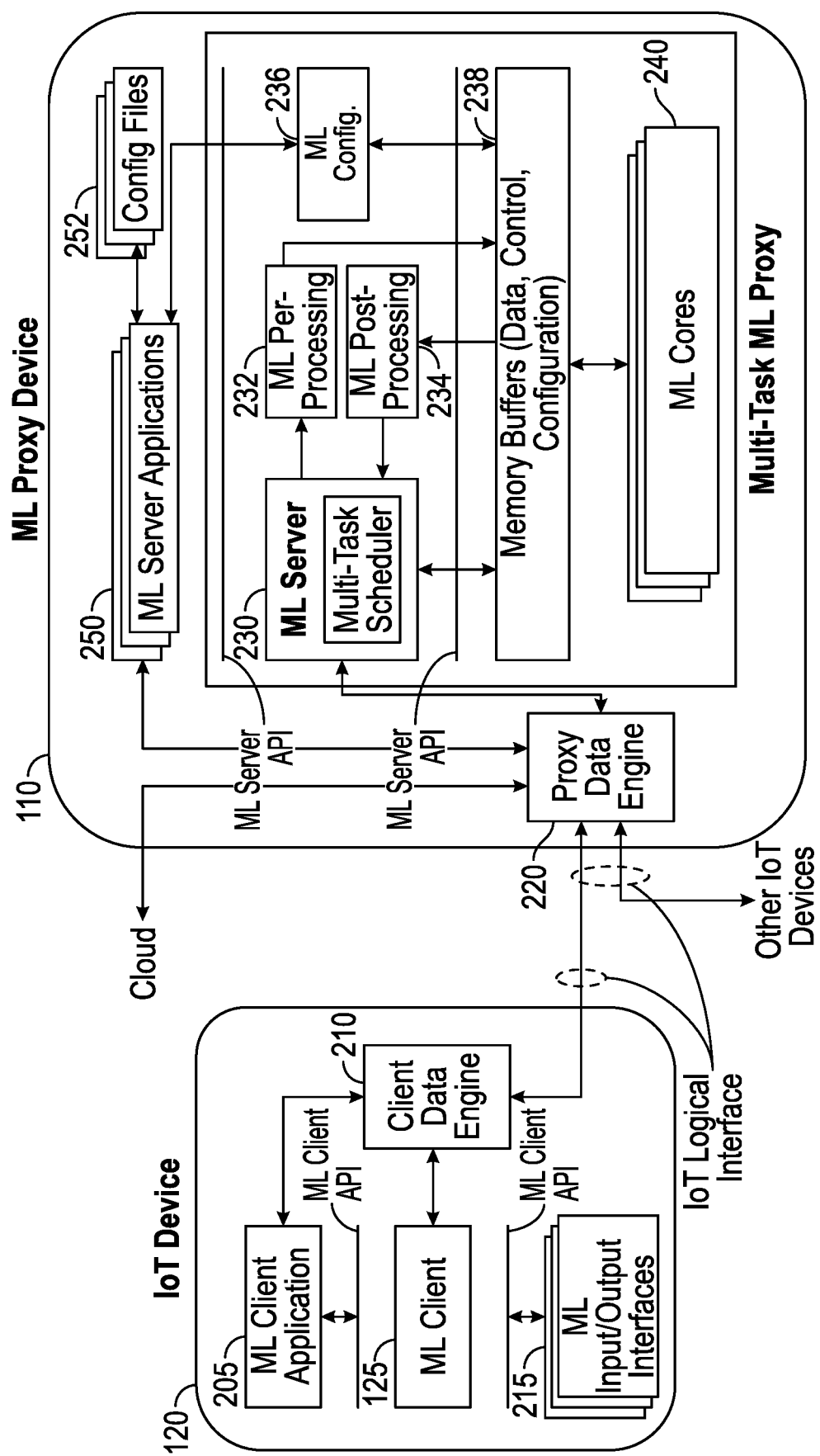
FIG. 2 shows an exemplary embodiment of a machine-learning (ML) proxy system illustrating components of an IoT device and a ML proxy device.

The system of FIG. 2 shows an embodiment of a machine-learning (ML) proxy system illustrating components of IoT device 120 and ML proxy device 110. The components shown in FIG. 2 are exemplary and not exclusive as both IoT device 120 and ML proxy device 110 can include more or fewer components than those shown in FIG. 2. In addition, the components illustrated in FIG. 2 can be understood as software components, hardware components, and/or combinations thereof.

In addition to ML client 125, FIG. 2 shows that IoT device 120 can include ML client applications 205, client data engine 210, and ML input/output (I/O) interfaces 215. ML client applications 205 include all of the protocols, programming, and routines running within IoT device 120. Among ML client applications 205 are applications capable of collecting input data during operation of IoT device 129, receiving the ML processing output data from ML proxy 115 via ML client 125, and applying machine learning to IoT device 120 based on the ML processing output data to implement certain device-specific functions on IoT device 120. ML client 125 provides the machine learning capabilities to ML client applications 205 by providing the collected input data to ML proxy 115, which identifies an ML core to perform the ML processing and provides the ML processing output data back to ML client 125. Device-specific functions include, for example, voice recognition, object classification, fault detection, and other functions relevant to the operation of IoT device 120. The type of device-specific function can depend on the type and capabilities of IoT device 120, the type of ML processing performed by ML proxy 125, and the input data collected from IoT device 120 used for ML processing.

ML I/O interfaces 215 within IoT device 120 enable the various operations of IoT device 120 to operate including in accordance with the machine learning applied by ML client applications 205 as well as to collect data from the operation of IoT device 120. For example, in an IoT device 120 implemented as a security system, ML I/O interfaces 215 can provide the control and data signaling to and from components in IoT device 120 such as a camera and other sensors that generate input data including images, video, and sensor data.

Client data engine 210 includes the data transport protocols like Bluetooth and WiFi that enable IoT device 120 to communicate with ML proxy device 110. Client data engine 210 can also include the IoT adapter that enables IoT device 120 to communicate with ML proxy device 110 when IoT device 120 does not support the same data transport protocol as any of the protocols supported by ML proxy device 110.

IoT device 120 can also include an ML client application programming interface (API) that facilitates and normalizes the internal communications between ML client applications 205 and ML client 125. The ML client API can provide an abstraction layer to enable ML client 125 to invoke any of the IoT data transport protocols available in client data engine 210, as well as the IoT adapter.

As also shown in FIG. 2, ML proxy device 110 includes similar components as IoT device 120 including proxy data engine 220, ML server applications 250, and ML configuration files 252 in addition to ML proxy 115. Proxy data engine 220 provides the same functions as client data engine 210, but for ML proxy device 110, by providing ML proxy device 110 with the data transport protocols that enable ML proxy device 110 to communicate with IoT devices 120. ML server applications 250 correspond to the ML client applications 205 on the IoT devices 120 and configure ML proxy 115 to serve the ML requests from corresponding IoT Devices 120. ML server applications 250 can also control the configuration by ML configuration 236 of ML models executed by ML cores to perform particular types of ML processing depending on the collected input data, the type of IoT device 120, and the desired ML processing output data. An ML server API facilitates and normalizes the internal communications between ML server applications 250 and ML proxy 125 including the various components within ML proxy 125.

ML proxy 115 resides in ML proxy device 110 and is configured to perform several functions that collectively provide ML proxy services to IoT devices 120. ML proxy 115 can be configured to adaptively support ML processing requirements for all of the ML clients 125 with which ML proxy 115 communicates. ML Proxy 115 can also be configured to handle pre-processing and post-processing on the data and requests input to and output from the ML Cores. ML server applications 250 and configuration files 252 enable this configurability by specifying the ML models to be implemented by the ML cores and enabling the ML models to be downloaded from cloud 160 dynamically. The pre-processing and post-processing includes, for example, adapting the data formats between the applications and the ML Cores.

ML proxy 115 itself comprises several components including an ML server 230, ML pre-processing 232, ML post-processing 234, ML configuration 236, memory buffers 238, and ML cores 240. ML server 230 within ML proxy 115 provides several different functions for ML proxy device 110 including communicating to and from a plurality of ML clients 125 within IoT devices 120, supporting multi-task ML processing for multiple ML clients 125 concurrently, and formatting data and ML requests for ML processing by one or more ML cores 240. ML server 230 communicates with ML clients 125 via the IoT transport protocols supported by the proxy data engine 220 within ML proxy device 110 and the IoT protocol stack within IoT devices 120. ML server 130 also invokes one or more ML cores 240 to process the ML requests received from IoT devices 120. Correspondingly, ML server 230 forwards the ML responses generated by ML Cores 240 to IoT devices 120.

The ML requests and responses are subject to appropriate pre-processing and post-processing by ML pre-processing 232 and ML post-processing 234, respectively. In particular, ML pre-processing 232 receives the data including any ML requests from ML server and adapts or changes the format to conform to the format understood by the ML core 240 receiving the ML request. Conversely, after processing by ML cores 240, post-processing 234 adapts or changes the format of the ML processing output data to a format understood by the applicable ML client application 205 configured to implement the applicable machine learning to the IoT device 120 based on the ML processing output data. Memory buffers 238 provide temporary or permanent storage of data, control, and configuration information shared by the various components of ML proxy 215. Memory buffers 238 can be implemented, for example, as RAM, ROM, hard drives, optical disks, other storage mediums, or some combination thereof.

ML cores 240 include the processors, hardware engines, software, programming, and other components that execute the (pre-trained) ML models. The (pre-trained) ML models can be resident in ML cores 240 or downloaded to them, such as from cloud 160. These (pre-trained) ML models may be pre-compiled (progressively) into the specific binary codes of ML cores 240 during the process of ML model downloading, which can reduce initialization and response time. Within the realm of machine learning, there are numerous types of ML models as are known by those skilled in the art with the ML models varying based on the types of data and the desired types of classifications and determinations to be made based on the data. For example, a pre-trained ML model for image recognition can produce image classification results based on received image data. ML cores 240 execute the pre-trained ML model using the collected input data from IoT devices 120 to produce ML processing output data, such as a classification result. Since the format of the ML processing output data can be specific to ML core 240, ML post-processing 234 can format the ML processing output data before providing the ML processing output data to ML server 230.

Figure 3:
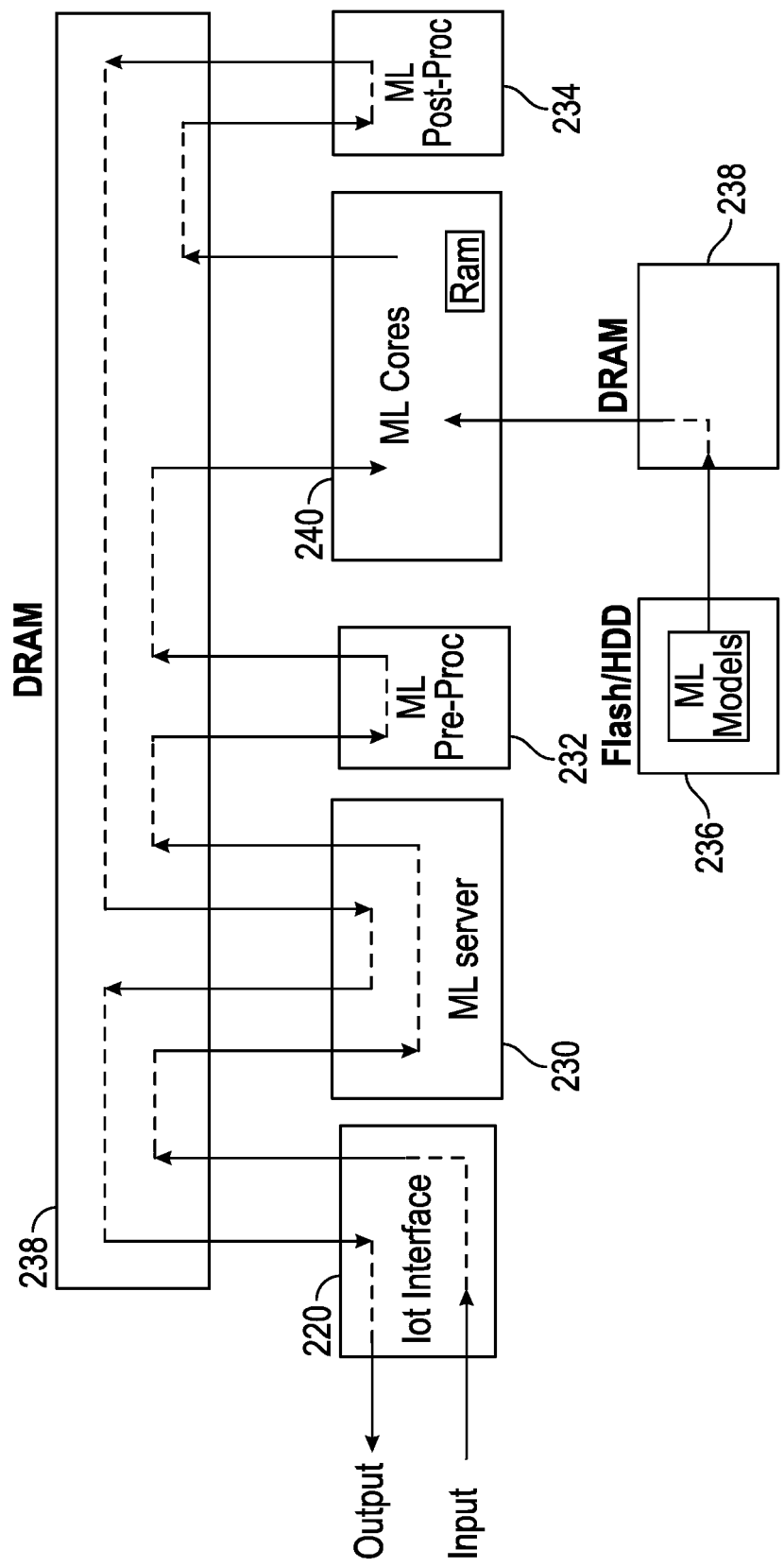
FIG. 3 shows an exemplary data path for a ML proxy operation performed on a ML proxy device according to some embodiments.

FIG. 3 shows an exemplary data path for an ML proxy operation performed on an ML proxy device according to an embodiment. As shown in FIG. 3, one or more ML clients 125 provide data including one or more ML requests to ML proxy device 115, which receives that data according to an IoT data transport protocol supported by proxy data engine 220. The received data including the ML request can be stored in memory buffer 238 or other memory storage available in ML proxy device 110.

ML server 230 locates the stored data and ML request, determines if any pre-processing of the data and ML request are needed, and if so, provides the data and ML request for reformatting by ML pre-processing 232. The memory buffer 238 can store and buffer the data and ML request before and after the reformatting performed by ML pre-processing 232. The reformatting by ML pre-processing 232 ensures that the data and ML request have a structure understood by the ML models executed by ML cores 240.

Depending on the data and ML request, as well as the ML client application 205 generating the ML request, an applicable ML model is determined by ML configuration 236 and provided to ML cores 240. Since ML cores 240 can provide ML processing to multiple ML clients at the same time, it may be necessary for the determined ML model to be buffered in memory buffer 238 before being provided to an available ML core 240. Once available, an ML core 240 uses the determined ML model to provide ML processing of the ML request using the collected input data from the ML client application 205 making the ML request. Any ML processing output data generated by ML core 240 can be stored in memory buffer 238.

Before providing the ML processing output data to the ML client 125, the ML processing output data can be reformatted by ML post-processing 234. The reformatting by ML post-processing 234 ensures that the ML processing output data has a structure understood by the ML client 125 and ML client application 205 making the ML request. ML server 230 extracts the reformatted ML processing output data from memory buffer 238 and provides it to proxy data engine 220 for transmission via the appropriate IoT transport protocol to the IoT device 120 hosting the ML client 125 and ML client application 205 making the ML request.

Figure 4:
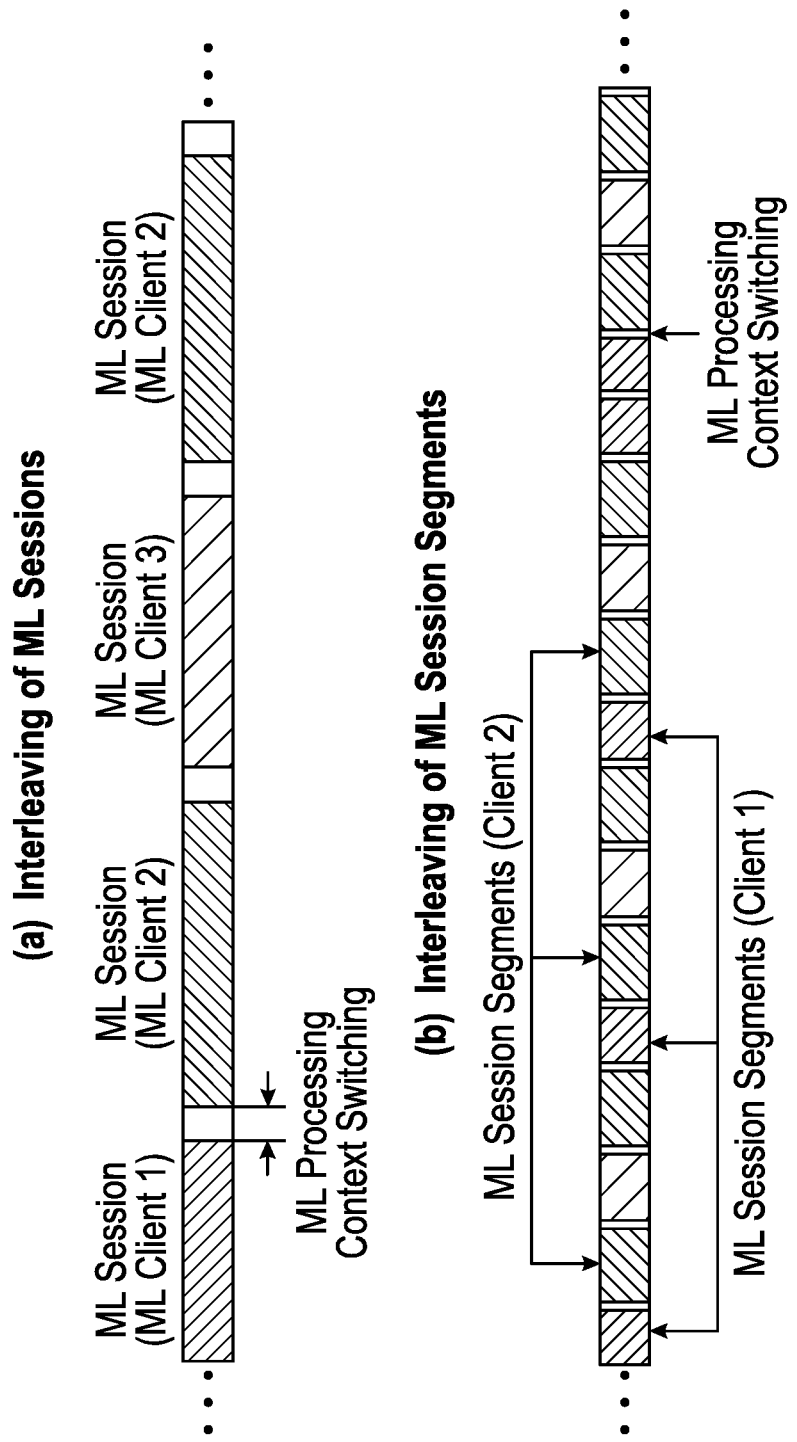
FIGS. 4(a) and 4(b) show a multi-tasking process a session level and a segment level, respectively according to some embodiments.

Since ML proxy 115 includes multiple ML cores 240, ML proxy 115 is capable of multi-task processing in support of multiple ML client applications 205 on multiple IoT devices 120 concurrently. As shown in FIGS. 4(*a*) and 4(*b*), the multi-tasking can be on a session level or a segment level. ML processing on a session level (FIG. 4(*a*)) provides all of the processing for a particular ML request from a particular ML client 125 before proceeding to the processing of a subsequent ML request. For example, all ML processing can be the complete inference operation of a neural network for a given input tensor data.

ML processing on a session-segment level (FIG. 4(*b*)) provides ML processing on a segment-by-segment basis in which ML requests from multiple ML clients 125 are broken up into multiple segments and then interleaved. For example, ML processing on a session-segment level can be an inference operation of one or more layers of a neural network. To perform the ML processing on a segment-by-segment basis, the session can be broken down into segments according to the number of layers within the ML model being used for the session. For example, an ML model having ten layers can be broken into two segments of five layers each.

To reduce wait times, particular sessions or segments can be given priority over other sessions or segments. Giving a priority designation to a session or segment allows for that session or segment to be processed earlier than other sessions or segments or before any other sessions or segments or processed. In addition, by including multiple ML cores 240 in ML proxy 115, sessions and segments can be processed in parallel, which further reduces the wait times for processing any particular ML request.

To handle either of the two multi-tasking modes illustrated in FIGS. 4(*a*) and 4(*b*), the ML server 230 can include a scheduler that is responsible for the sharing and scheduling of ML resources including ML cores 240 and memory buffer 238. The scheduler performs any necessary context switching when transitioning from processing for one session or session segment to another session or segment. Context switching can include the preservation of the context (e.g., data, ML model, processing results, etc.) for the on-going processing of a particular session or segment and the restoration of that context for the next processing task executed by ML cores 240. For example, for an ML inference, the processing context can include the ML model and its current operational state information.

Figure 5:
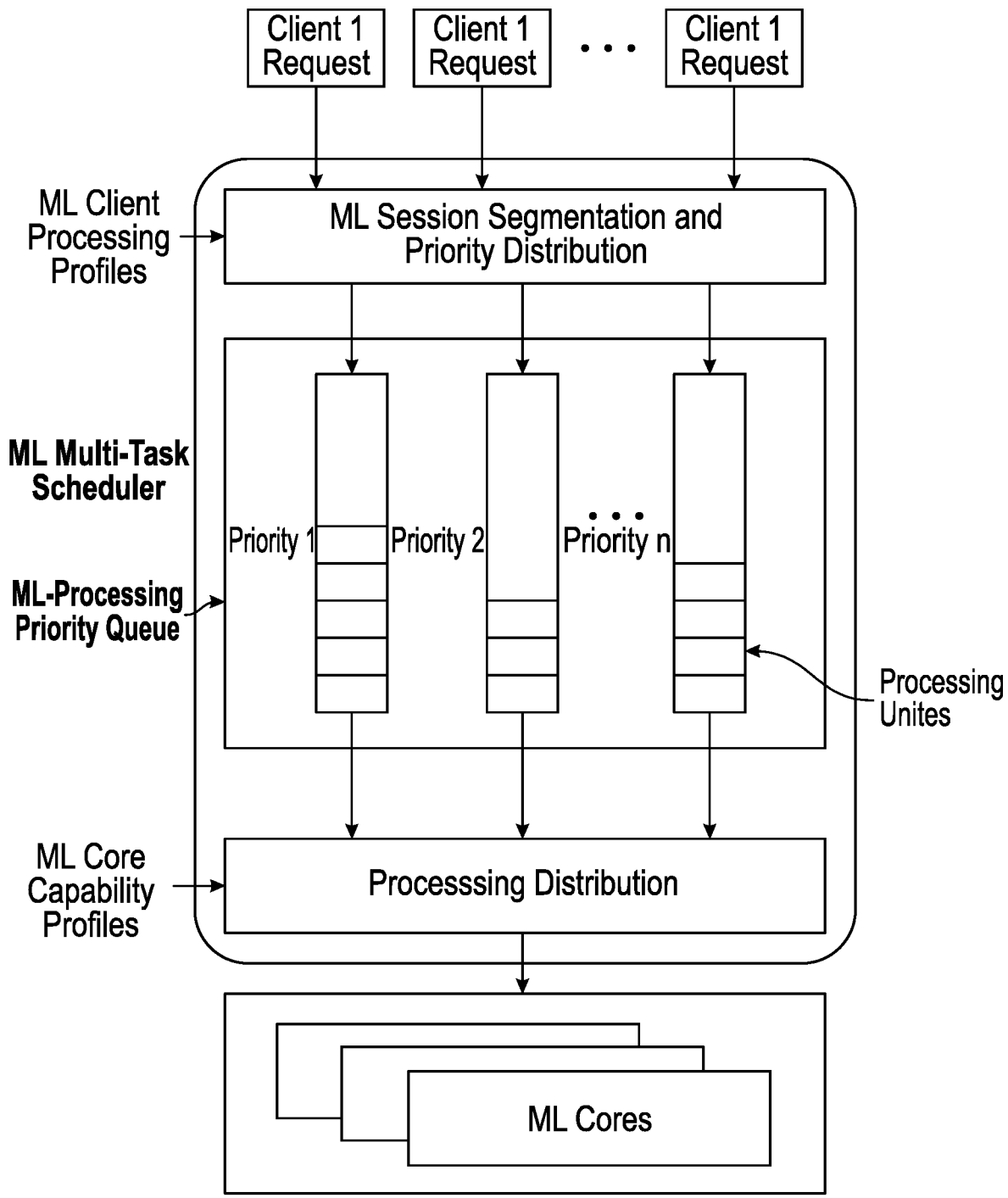
FIG. 5 shows an exemplary configuration of a ML multi-task scheduler according to some embodiments.

FIG. 5 shows an exemplary configuration of an ML multi-task scheduler according to an embodiment. The ML multi-task scheduler can be configured to implement a priority-queue-based scheduling scheme for processing of ML requests received from ML clients 125. As shown in FIG. 5, the scheduler includes an ML Session Segmentation and Priority Distribution function, which is responsible for dividing sessions into segments (if necessary) and the distribution of sessions and segments to the Processing Units among various priority queues. An ML Client Processing Profile, which can be included in an ML request received by ML proxy 115 from an ML client 125, determines how the segmentation and priority distribution operation is executed based on "Quality-of-Processing" (QOP) parameters specified in the ML request. The QOP parameters can include, for example, a latency bound, a processing complexity (e.g., in terms of Operations Per Second (OPS)), memory requirements, data bandwidth, input frequency, and security requirements, although other parameters can also be included. The ML Client Processing Profile can be communicated by ML client 125 to ML Proxy 115 during a configuration procedure.

Having segmented the session and made the priority distribution determination, ML multi-task scheduler maps the sessions and segments into one or more Processing Units, which could be a complete ML processing session or segments of the session. An ML processing session spans between the input of the client input data to ML cores 240 and the output of the processing result from ML cores 240. The different queues have different priorities. A Processing Distribution function takes into account the different priorities when determining which Processing Units in the priority queues to distribute to ML cores 240 for execution. For example, the distribution scheme performed by the Processing Distribution function can take into consideration the queue status, the status of ML cores 240, and the capabilities of ML cores 240. In general, the scheduling policy of the Processing Distribution function gives higher preference for scheduling execution to the Processing Units in a higher-priority queue. The scheduling policy of the Processing Distribution function can also take into consideration other factors such as fairness and non-starvation.

With respect to the capabilities of ML cores 240, each ML core 240 can include an ML core capability profile. The core capability profile of a given ML core 240 can be represented by a number of attributes including, for example, processing capacity (e.g., in terms of OPS), memory capacity, suitable ML model types, security level, power and thermal characteristics, and multi-tasking support, although other attributes can also be included.

Figure 6:
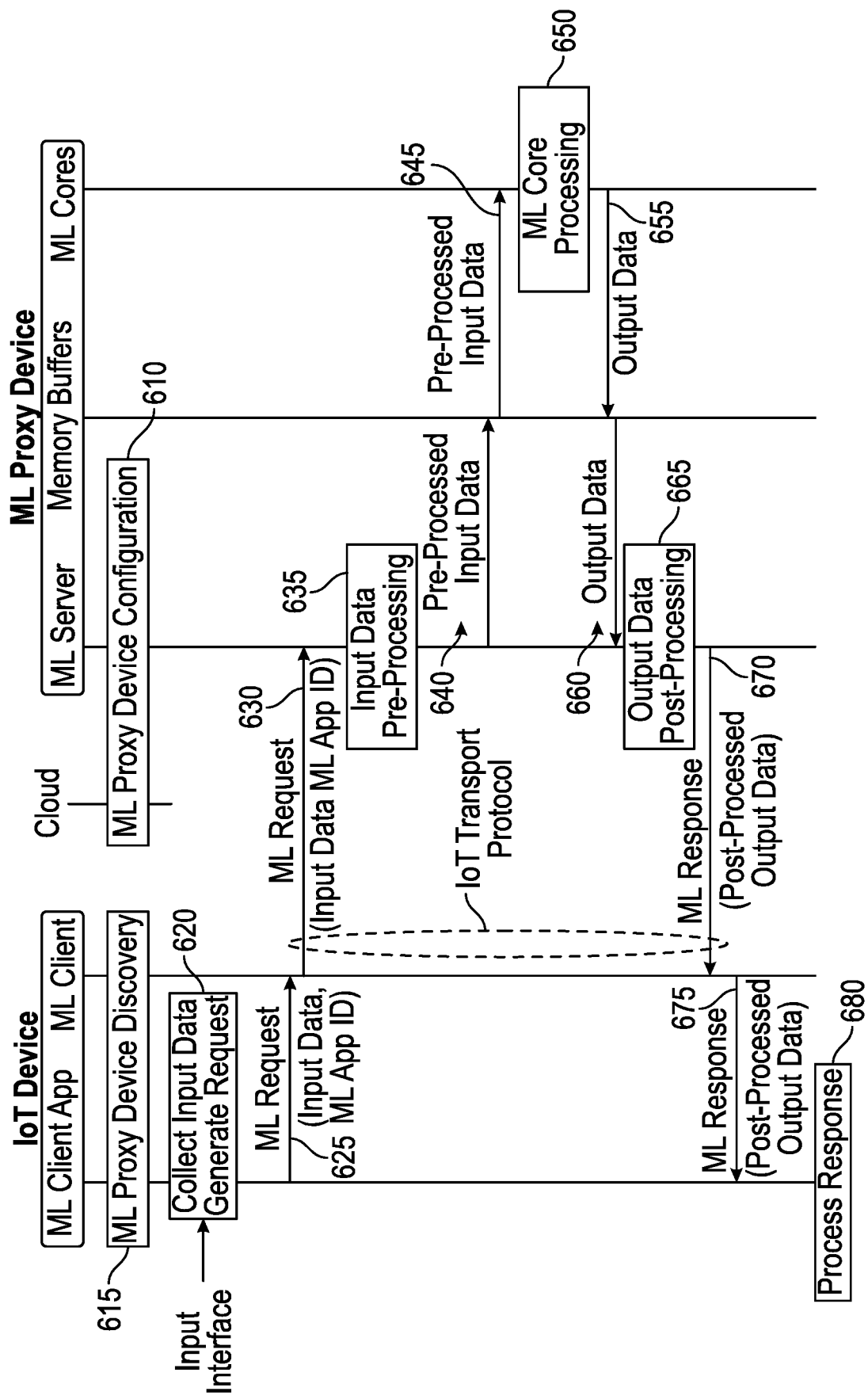
FIG. 6 illustrates a high-level diagram of message flows between IoT devices and a ML proxy device in accordance with some embodiments.

FIG. 6 illustrates a high-level diagram of message flows between IoT devices and an ML proxy device in accordance with an embodiment. Before implementing the data flow for initiating an ML request, ML server 230 and ML cores 240 are first configured (610). Once their configuration is completed, ML Proxy 125 is ready to serve the ML client applications 205 operating on IoT devices 120.

As shown in FIG. 6, the message flow starts when an ML client application 205 on an IoT device 120 first attempts to discover the ML proxy device 110 providing the ML processing services desired by the ML client application 205 (615). The discovery of the ML proxy device 110 can be performed statically or dynamically. Static discovery can be through static configuration of the contact address of ML proxy device's 110. Dynamic discovery can be through dynamic messaging with a device-discovery protocol as are known to those skilled in the art.

Once the IoT device 120 has discovered the ML proxy device 110 providing the desired ML processing services, ML client application 205 running on IoT device 120 collects the input data needed for the ML processing and sends a request to ML client 125 using the ML client API (620, 625). The request provided to ML client 125 includes the collected input data and an identifier of the ML client application 205 producing the request. The ML client 125 then passes the collected input data and the identifier of the ML client application 205 as an ML request to the ML proxy device 110 using the ML client API and a particular IoT data transport protocol from client data engine 210 (630). As noted previously, in the event the IoT data transport protocol used to pass the ML request to ML proxy device 110 is not supported by ML proxy device 110, client data engine 210 can include an adaptor to enable the ML request to be communicated properly to ML proxy device 110.

Upon receiving the incoming ML request at ML proxy device 110, ML Server 230 evaluates the ML request and determines if any reformatting of the ML request, including the collected input data, is needed by pre-processing 232 (635). Pre-processing 232 can be performed to transform and normalize the collected input data into a format as required by the ML model that will be used to process the collected input and by ML cores 240. For example, if the collected input data includes image data, the transformation and normalization can include scaling or cropping a whole image into an image portion. After pre-processing, the pre-processed input data can be written in memory buffers 238 (640).

To perform ML processing on the pre-processed input data, ML cores 240 read the pre-processed input data from the memory buffers 238 and perform the corresponding ML processing according to the ML model appropriate for the ML client application 205 producing the ML request, such as a neural-network inference (645, 650). ML cores 240 generate ML processing output data and write the result as output data into memory buffers 238 (655). The ML processing output data in memory buffers 238 can then be extracted from memory buffers 238 and post-processed by post-processing 234 (660, 665). Post-processing 234 can convert the ML processing output data from a format specific to the ML model and ML cores 240 into a format that can be utilized by the ML client application 205 originally requesting the ML processing.

ML Server 230 identifies the IoT device 120 hosting the ML client application 205 making the ML request associated with the ML processing output data and sends the ML processing output data to the identified IoT device 120 via the appropriate IoT data transport protocol (670). The ML client 125 then passes the received ML processing output data to the ML client application 205 that made the ML request (675). After receiving the ML processing output data, ML client application 205 processes the received data and refines its operation accordingly (680).

Referring back to FIG. 2, ML server application 250 and ML configuration file 252 specify the ML models to be implemented by ML cores 240. ML server application 250 and associated ML configuration file 252 can be configured into ML proxy device 110 and embody various ML models, such as for a neural-network based machine-learning application. For example, the ML models can be specified with TensorFlow, Cafe2, PyTorch, or any other machine-learning framework.

Figure 7:
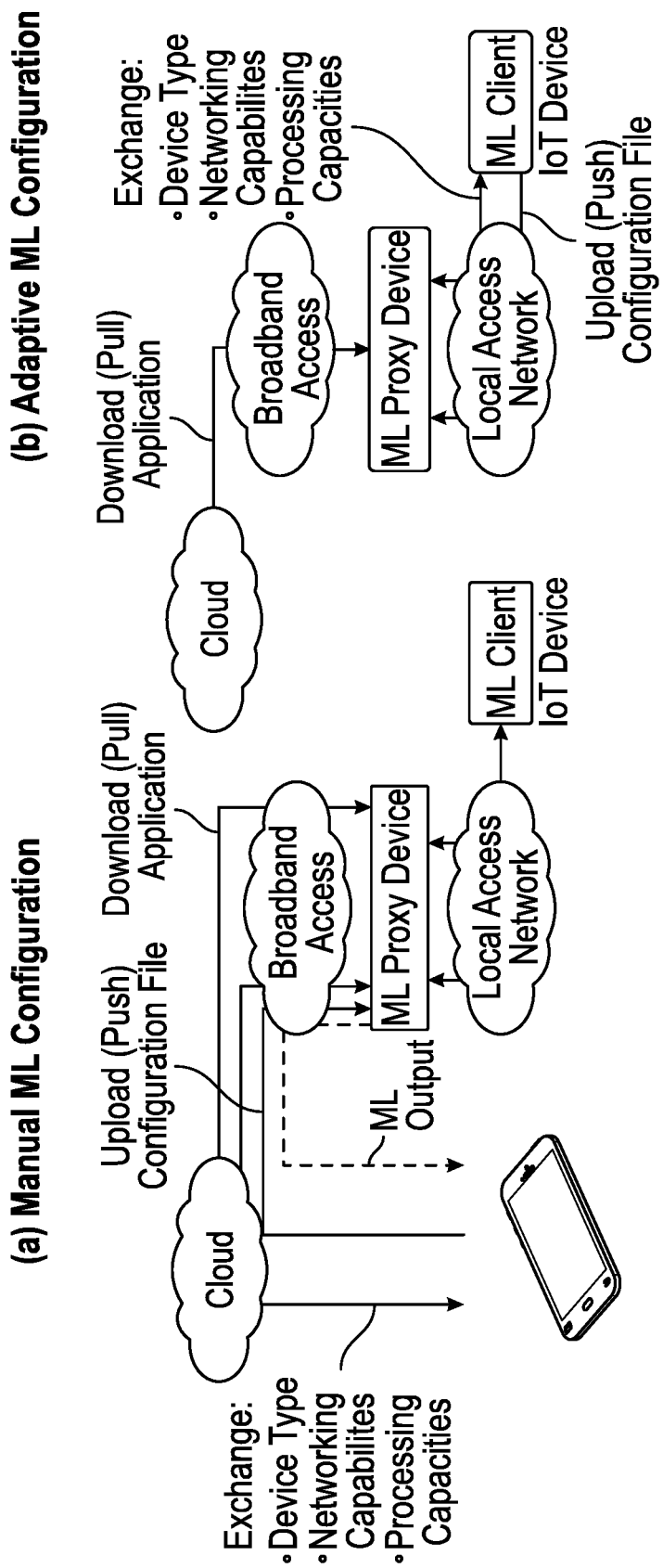
FIGS. 7(a) and 7(b) illustrate manual and adaptive configurations, respectively, of a ML server application and a ML configuration file according to some embodiments.
Figure 8:
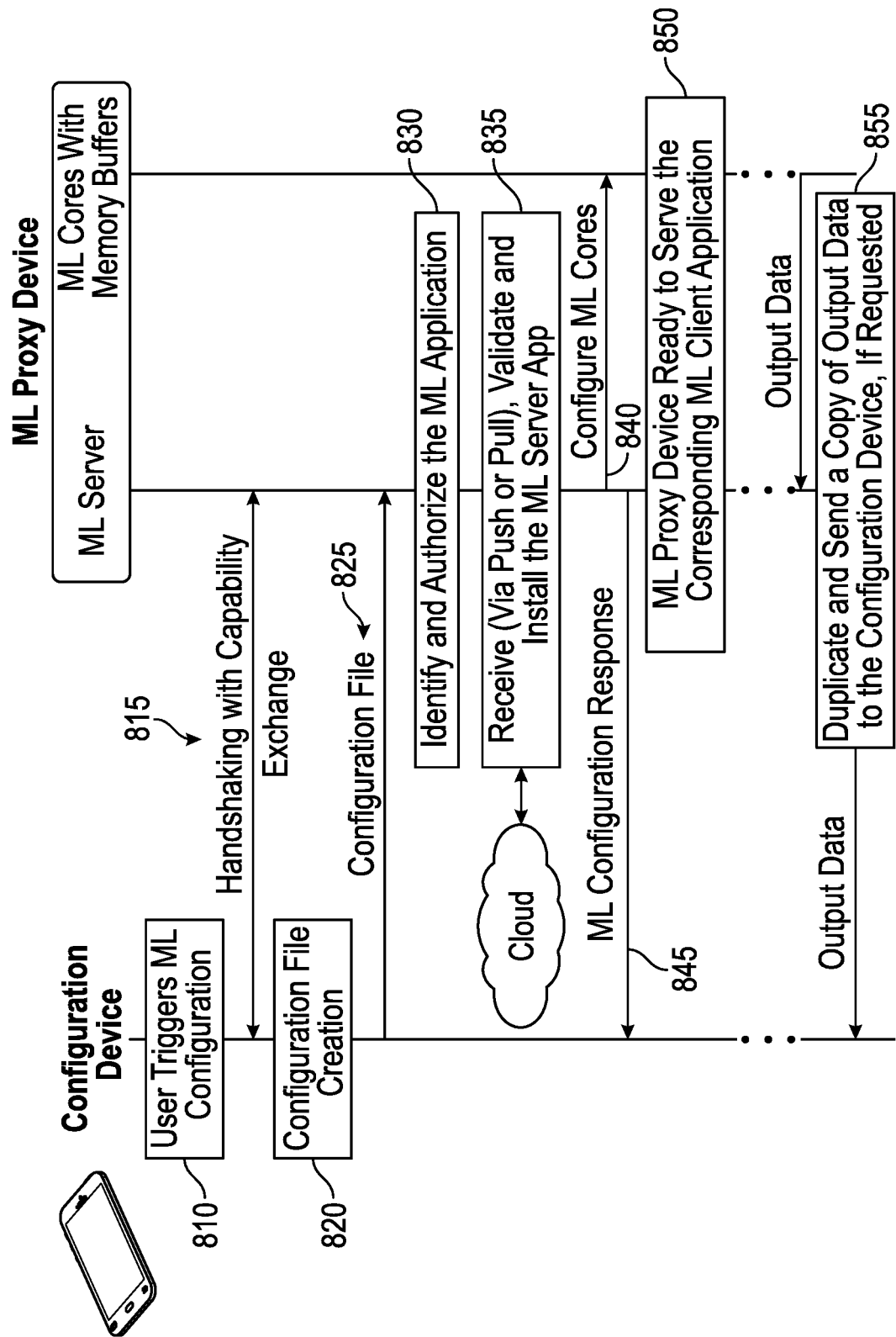
FIG. 8 illustrates a high-level diagram of message flows for a manual configuration mode in accordance with some embodiments.

To configure ML server application 250 and ML configuration file 252, the configuration can be performed manually or adaptively. FIGS. 7(a) and 7(b) illustrate manual and adaptive configurations, respectively, according to an embodiment. FIG. 8 illustrates a high-level diagram of message flows for the manual configuration mode in accordance with an embodiment. As shown by FIG. 7(a) and illustrated by the message flow in FIG. 8, in the manual configuration mode, a user can use a control device, such as a smart phone, tablet, laptop, or other computerized device with communication capabilities, as a configuration device to trigger and carry out the configuration of ML server application 250 and ML configuration file 252 within ML proxy device 110 while also performing appropriate control of the associated IoT device 120 and it support by ML proxy device 110 (810). The configuration device may be a separate device or the IoT Device 120 itself. The configuration device can also be configured to request the user to set a security policy for the ML client applications 205. The security policy can establish whether ML client 125 has permission to connect and route ML collected input data from a ML client application 205 to ML proxy device such as by requiring submission of user credentials or other conditions ensuring proper authorization.

After triggering the configuration, the configuration device and ML proxy device 110 perform handshaking and exchange the information (815). The exchanged information can include various data and parameters including, for example, device type, device networking capabilities, device processing capacities, an ML Client Processing Profile.

Based on the exchanged information, the configuration device selects an appropriate configuration file 252 and uploads it to ML proxy device 110, and more particularly to ML server 230 within ML proxy device 110 (820, 825). Configuration file 252 includes information about operational requirements for ML client applications 205 operating on the IoT device 120. The operational requires include, for example, processing requirements, memory usage, data transmission, and power consumption. Processing requirement can be based on the type of input data collected by the ML client application 205, such as video and image resolution. In response to receiving configuration file 252, ML proxy device 110 allocates the resources needed to perform the ML processing of the ML client applications 205. The resources include, for example, ML cores 240, memory buffers 238, and transmission bandwidth for supporting the IoT data transport protocol between IoT device 120 and ML proxy device 110.

In addition, based on the information regarding ML client applications 205, such as application identifiers, present in configuration file 252, ML proxy device 110 can download and install a corresponding ML server application 250, such as from a cloud server (830, 835). When installed, ML server application 250 configures and prepares ML proxy device 110 including ML cores 240 to accept and process the ML requests from the ML client 125 managing ML client applications 205 on IoT device 120 (840). ML proxy device 110 can also provide an acknowledgment to the configuration device that the ML configuration is complete (845). At this point, ML proxy device 110 is configured and ready to provide ML processing to ML requests from the ML client 125 managing ML client applications 205 on IoT device 120 (850).

The configuration device can present the user with the option of how to view the ML processing output data. For example, the user option can be to view the ML processing output data via pulling in which the user requests the data or via pushing in which the provision of the data is triggered by ML proxy device 110 (855).

Figure 9:
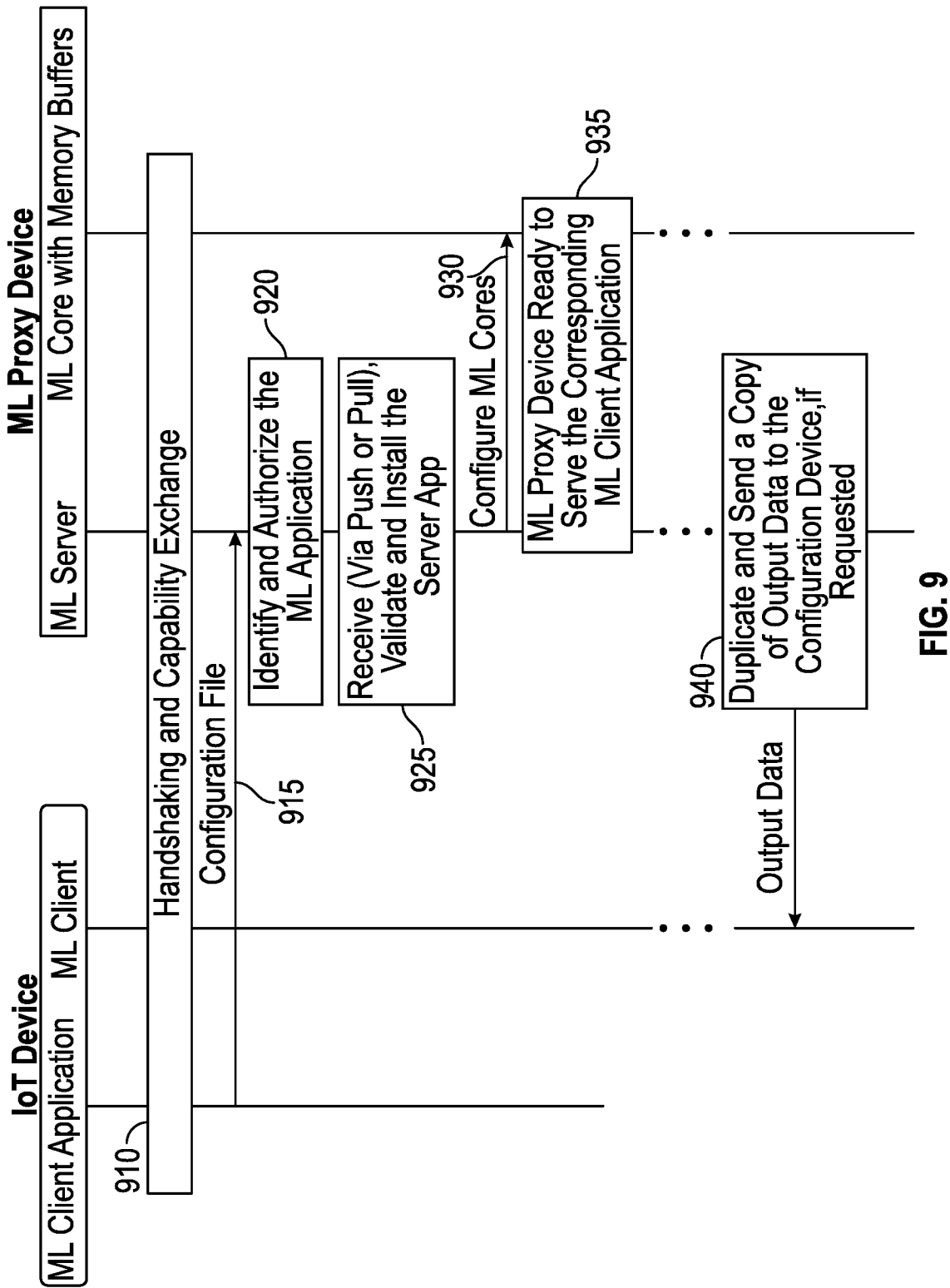
FIG. 9 illustrates a high-level diagram of message flows for an adaptive configuration mode in accordance with some embodiments.

FIG. 7(b) shows an example of an adaptive configuration mode according to an embodiment. FIG. 9 illustrates a high-level diagram of message flows for the adaptive configuration mode in accordance with an embodiment. As shown by FIG. 7(b) and illustrated by the message flow in FIG. 9, in the adaptive configuration mode, instead of pre-installing ML server application 250 and associated ML configuration file 252, the two can be installed when an ML client application 205 is first invoked. In this case, the IoT device 120 itself acts as the control device and carries out the initial handshaking and configuration file 252 uploading with ML server 230 (910, 915). This capability enables the disclosed scheme to be adaptable to dynamic and automatic on-boarding of IoT devices 120 that are to be served by ML proxy device 110, without any user intervention. The remaining message flow in FIG. 9 is similar to the corresponding message flow shown in FIG. 8.

Regardless of the configuration mode used, secure operation of ML client applications 205 can be provided by validating the downloaded ML server application 250 and configuration file 252 with ML proxy 115 before their activation. The validation can involve the decryption and/or digital signature verification of the downloaded files, with the configuration information being saved in a secure memory region.

Figure 10:
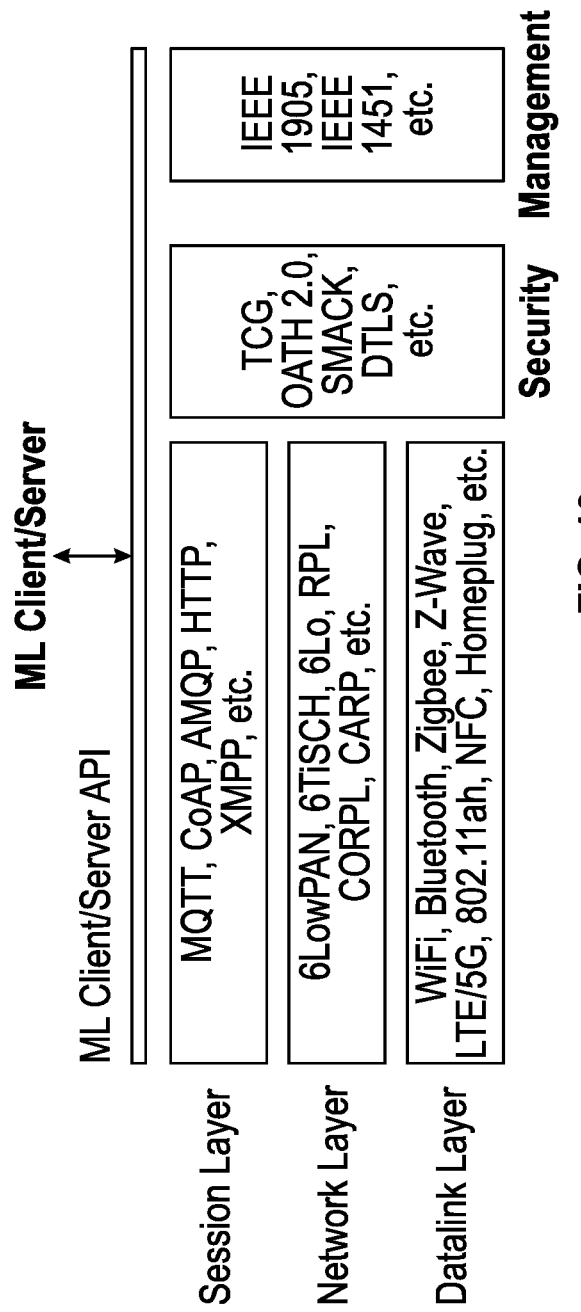
FIG. 10 shows exemplary protocols for performing communication among layers of the OSI model in accordance with some embodiments.

Communication of data and messages between the various components in the ML proxy system can be effected using communication systems and models as are known to those skill in the art such as Open Systems Interconnect (OSI). FIG. 10 shows exemplary protocols that can be used to perform communication among layers of the OSI model while also providing security and management of the data and messages shared among the components. The protocols identified in FIG. 10 are exemplary only, and it should be understood that other protocols can be used to implement the session, network, and datalink layers, as well as for security and management of the data and messages.

Figure 11:
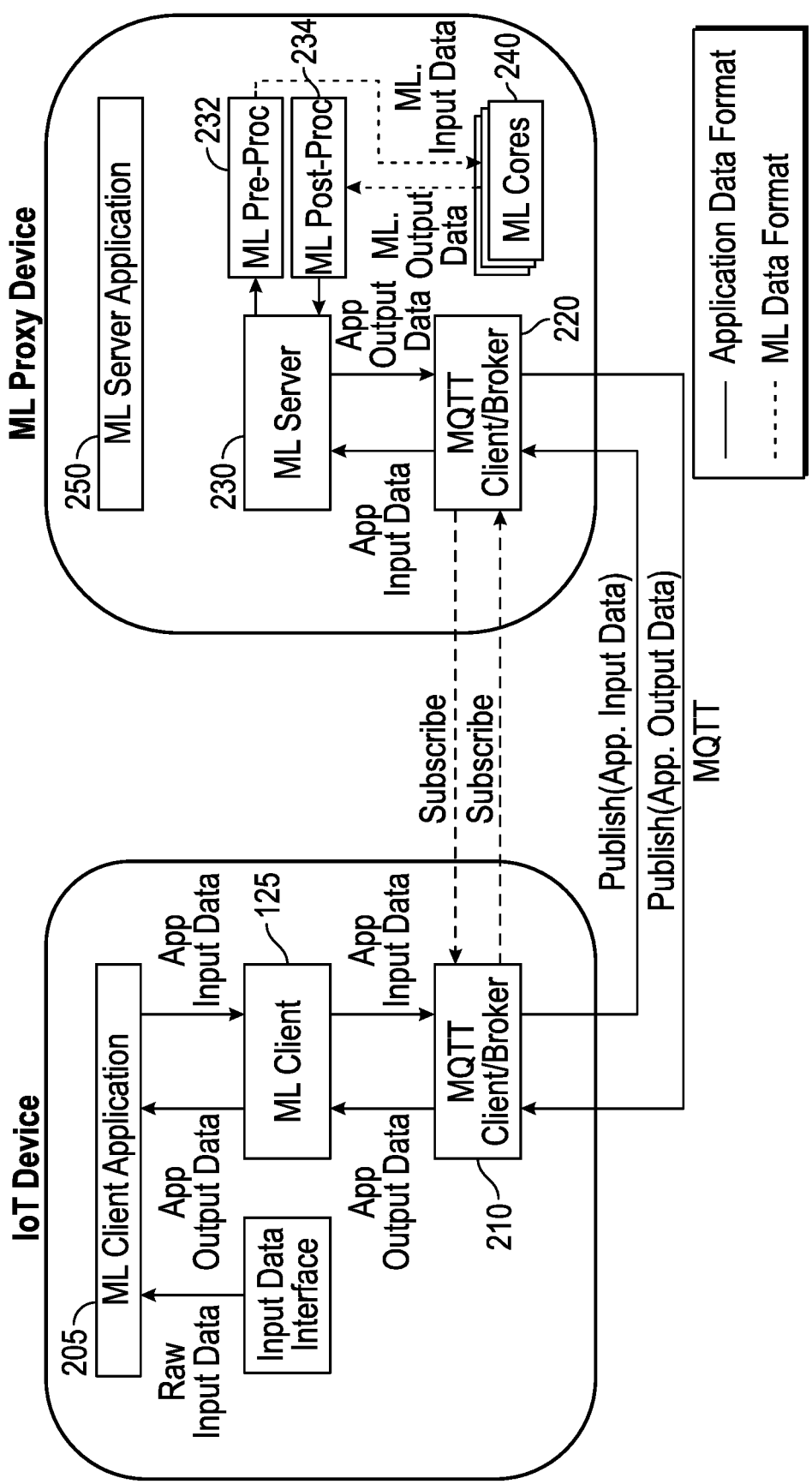
FIG. 11 shows an exemplary embodiment in which an IoT device communicates with a ML proxy device using MQTT.

FIG. 11 shows an example in which an IoT device 120 communicates with ML proxy device 110 using MQTT according to an embodiment. As shown in FIG. 11, ML client 125 can be configured to subscribe to an ML processing output data event using an MQTT client included within client data engine 210 that communicates with an MQTT broker included within proxy data engine 220 for ML server 230. Similarly, ML server 230 can be configured to subscribe to the ML collected input data event using an MQTT client included within proxy data engine 220 that communicates with an MQ broker included within client data engine 210 for ML client 125. Any relevant metadata associated with the ML request/response, such as the application identification or the IoT device/user identification, can be included with the ML collected input data event and the ML processing output data event, in addition to the data corresponding to those events.

In the example of FIG. 11, IoT devices 120 can be directly connected to ML proxy device 110 using device-specific data-link layer protocols such as WiFi or Bluetooth while each side uses use MQTT as the IoT data transport protocol. To enable communication using this or other communication scenarios, the ML proxy device 110 can be configured to support multiple data-link layer protocols that can communicate with IoT devices 120 having different protocols.

Figure 12:
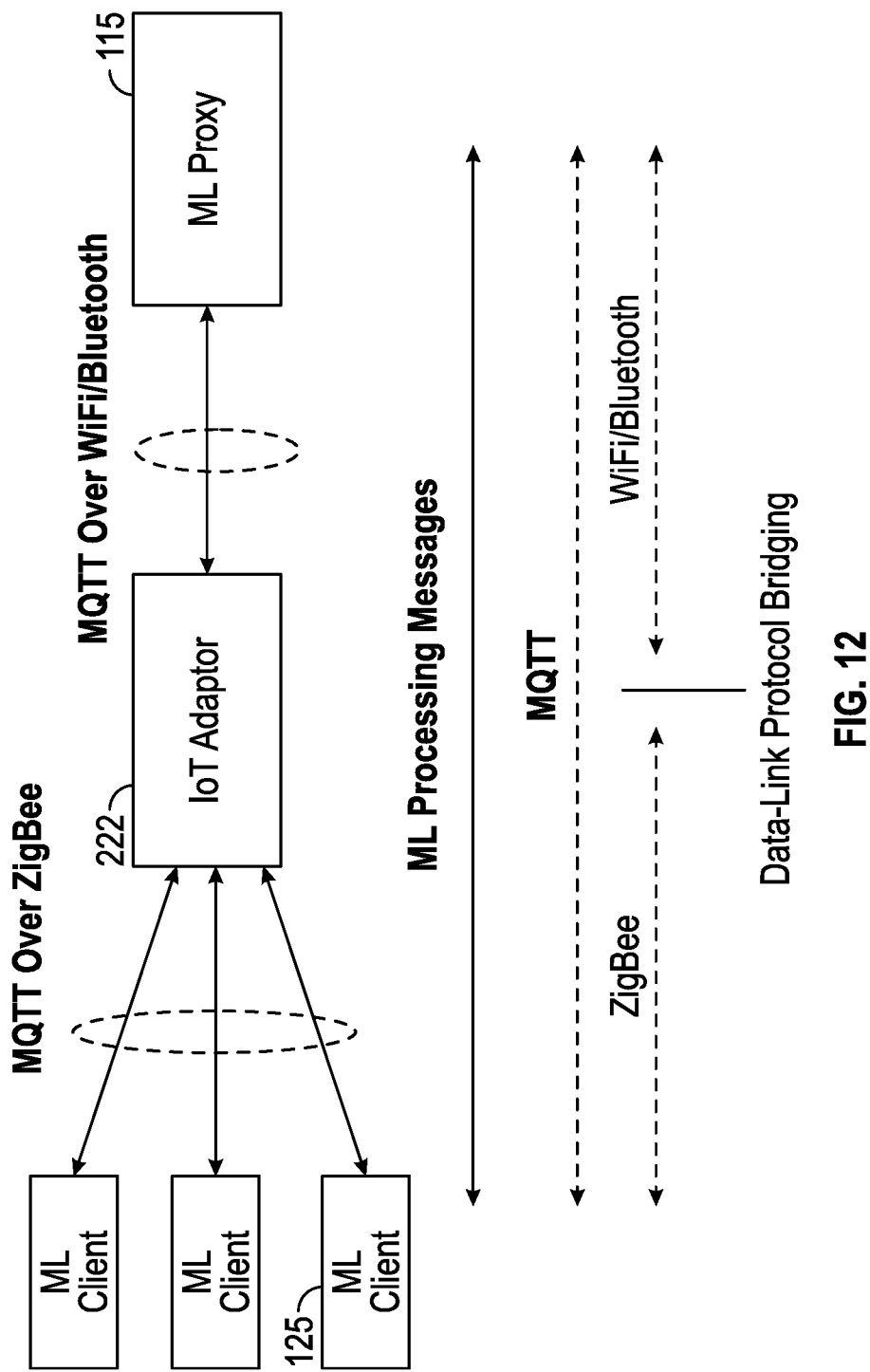
FIG. 12 shows an exemplary embodiment of using an IoT adaptor to link communication between ML clients and a ML proxy.

Instead of the direct communication illustrated in FIG. 11, IoT devices 120 can have applications that communicate indirectly with ML proxy device 110 through an intermediate IoT adaptor 222. IoT devices 120 can communicate with IoT adaptor 222 using an application-specific IoT data transport protocol that is different from the one used for the communications between IoT adaptor 222 and ML proxy device 110. IoT adaptor 222 performs the bridging between the two different IoT data transport protocols that enables the indirect communication between IoT devices 120 and ML proxy device 110. FIG. 12 shows an example of using IoT adaptor 222 to link communication between ML clients 125 in IoT devices 120 and ML proxy 115 in ML proxy device 110. As shown in FIG. 12, the two data transport protocols are WiFi/Bluetooth and ZigBee. With IoT adaptor 222 bridging the communication between the two different IoT data transport protocols, ML clients 125 across the IoT devices 120 can communicate with ML proxy 115 of ML proxy device 110 using a single unified IoT data transport protocol such as MQTT, although there are a wide range of IoT data transport protocols that can be used as are known to those skilled in the art.

Figure 13:
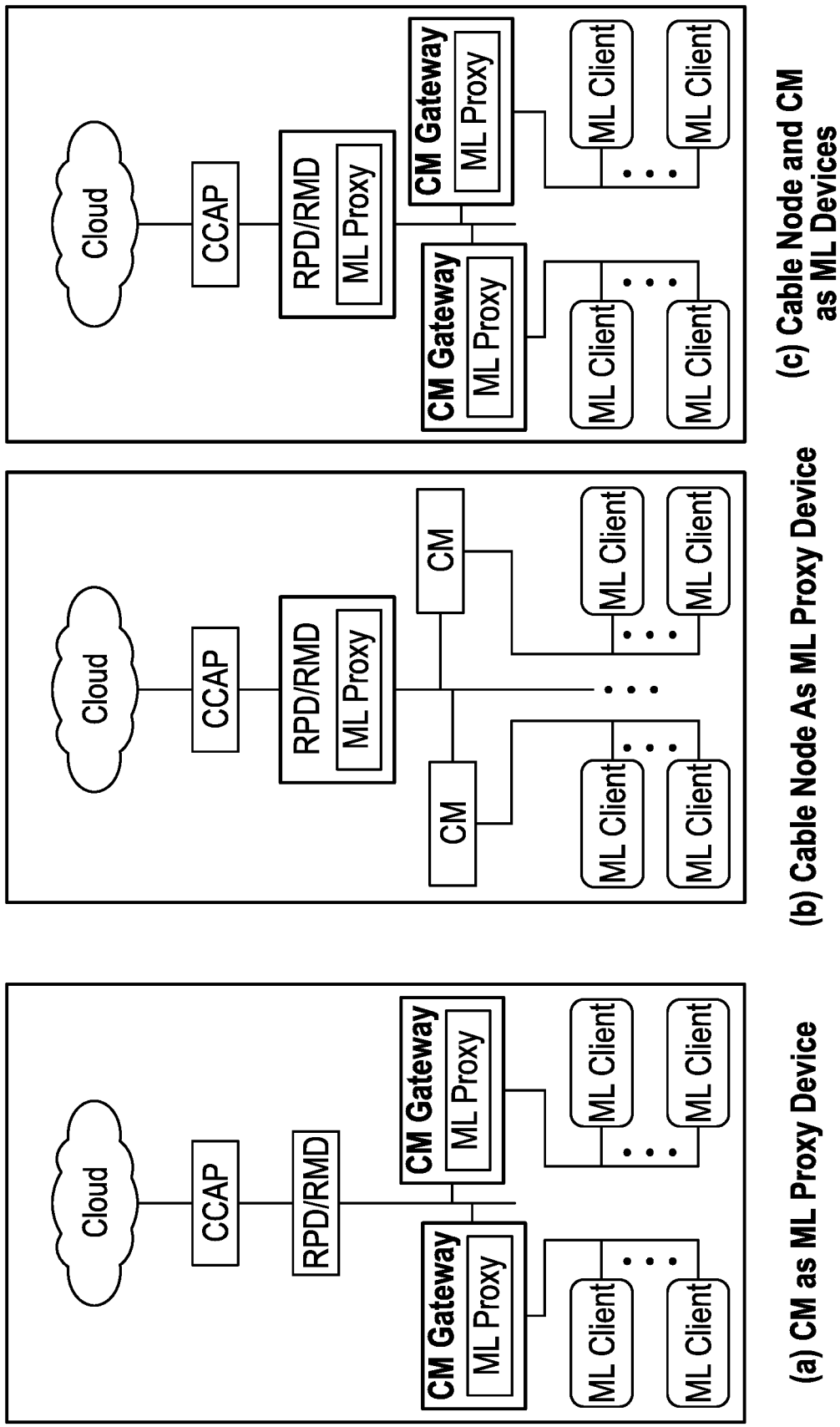
FIGS. 13(a)-(c) illustrate exemplary embodiments of integrating a ML proxy device in a cable broadband access system.

As noted previously, ML proxy device 110 can be implemented across a variety of different devices including, for example, a residential broadband gateway, a broadband access node, or both in combination. Exemplary broadband access systems include, for example, cable, xDSL, and xPON. FIGS. 13(a)-(c) illustrate examples of integrating ML proxy device 110 in a cable broadband access system.

In FIG. 13(a), ML proxy 115 is integrated in a CM gateway and serves IoT devices 120 attached to the CM gateway via a local area network. In FIG. 13(b), ML proxy 115 is integrated in a node device, such as an RPD/RMD, and serves IoT devices 120 attached to the CM gateways under the node device. In FIG. 13(c), ML proxy 115 resides in both the node device and one or more CM gateways under the node device. In each of these cases, the ML processing resources across multiple ML proxies 115 can be shared by IoT devices 120 across the CM gateway boundaries. ML proxy device 110 can also be implemented as a dedicated standalone device that resides in local area network 140 or broadband access network 150.

Although only one ML proxy device 110 and associated ML proxy 115 is shown in FIG. 1, it should be understood that the ML proxy system can include multiple ML proxy devices 110 and ML proxies 115. The multiple ML proxies 115 can also be configured to work cooperatively by sharing the ML processing resources including, for example, multiple ML models for different type of applications and multiple ML cores 240. The shared ML processing resources can be dynamically assigned to the distributed ML proxies 115 by a central ML service controller.

The ML proxy system of FIG. 1 can enable multiple IoT devices 120 to take advantage of ML processing capabilities without having to host the necessary software, programming, and hardware required to provide such ML processing capabilities. To ensure that the ML processing provides a useful result that can be implemented by ML client applications 205 operating on IoT device 120, it is useful to be able to collect significant volumes of input data from ML client applications 205 and provide that collected input data to ML proxy device 110 for ML processing.

One system and method for providing efficient and access-controlled data collection from mass-deployed embedded systems, such as IoT devices 120, is to use dynamically programmable data-collection agents, which can be referred to as servlets. Such embedded systems include, for example, set-top boxes, DOCSIS cable modems/CMTS/RPHY, xDSL modems/DSLAM, xPON ONU/OLT, as well as other devices as are known to those skill in the art. Service providers, such as cable companies, Internet service providers, or telecommunication companies, deploy these embedded systems in the field in large-scale, and their functions, including the data collection functions of the servlets, can be realized on the embedded systems.

The servlets, which can be launched dynamically, are highly programmable and provide the functionality to collect data from the embedded systems as needed. The servlets, which can be referred to as data agents or intelligent data agents, perform the data-collection tasks for a specific functional area of the embedded systems, such as by following real-time data poll requests from a data collection network portal or pushing the collected data to the data collection portal as scheduled by a configuration file. The data collection portal can be implemented, for example, in a database or a server.

The data collection can also be regulated by an access-control list, which is configured into the embedded system and precisely specifies the data items permitted for collection by the servlets. In addition, data items in the embedded systems can be specified by a hierarchical-tree data model. Using such a model, each servlet can be configured to cover a specific data model branch under the root of the model. In response to a data query request, one or more servlets can be activated to target one or more sub-branches in the data-model tree and collect the associated data. The dynamically configurable nature of the servlets, in conjunction with the access control and use of hierarchical-tree data models, allows for large-scale data collection across a mass population of targeted devices. The data collection can also be effected using both push and pull modes as well as real-time and non-real-time schedules.

Figure 14:
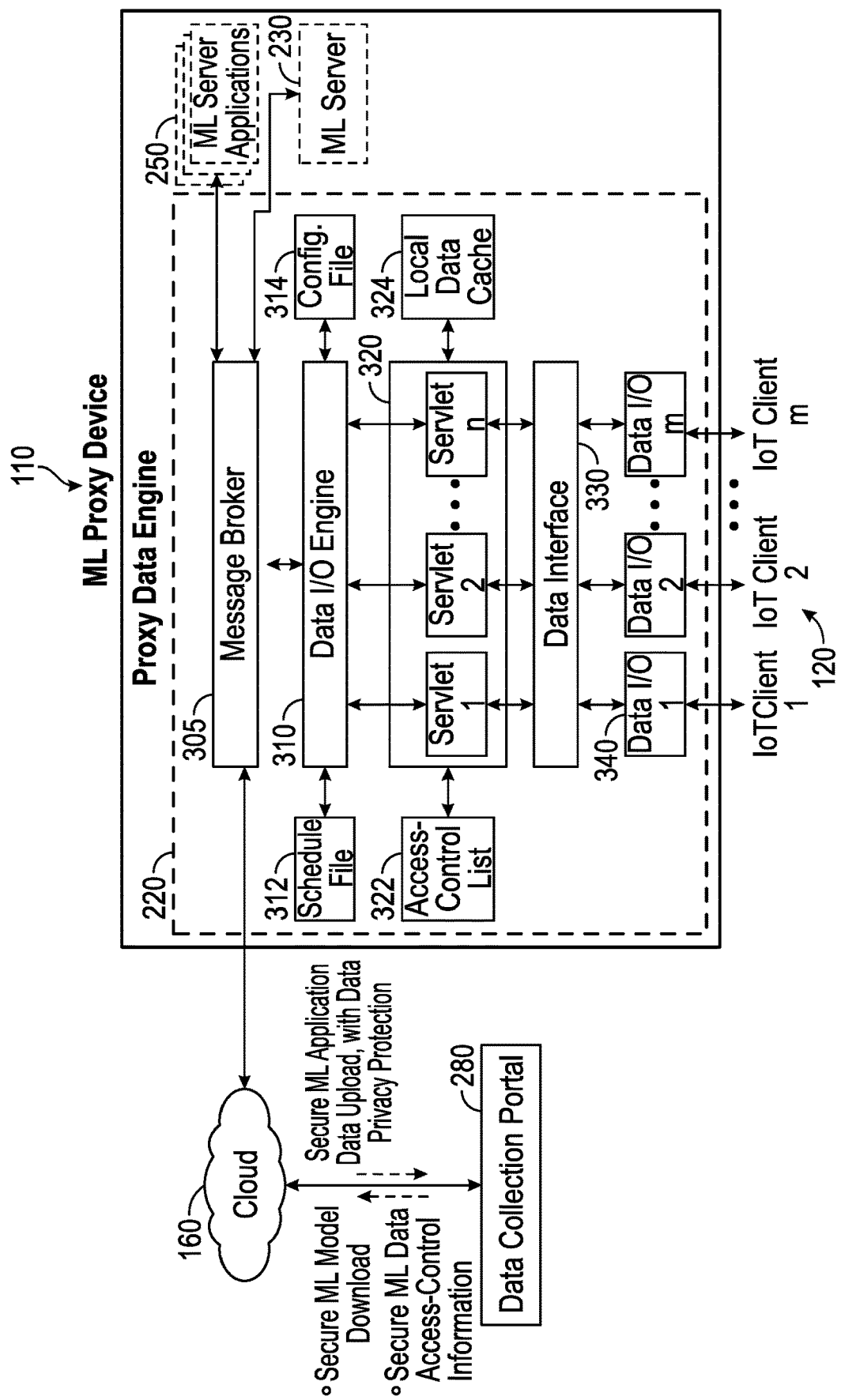
FIG. 14 illustrates exemplary components of a proxy data engine according to embodiments.

FIG. 14 illustrates exemplary components of a proxy data engine according to embodiments. As shown in FIG. 14, ML proxy device 110 includes proxy data engine 220. Proxy data engine includes a number of components including a message broker 305, a data I/O engine 310, a plurality of servlets 320, a data interface 330, and a plurality of data I/O ports 340. Data I/O engine 320 is configured to communicate with a schedule file 312 and a configuration file 314. Servlets 320 are configured to communicate with an access control list 322 and a local data cache 324. Proxy data engine 220 can be implemented in hardware, software, or a combination thereof and can include one or more processors, such as CPUs or ASICs, one or more memory modules, such as RAM, ROM, hard drives, optical disks, or other storage mediums, and software, such as programs, routines, operating systems, plugins, or applications.

Message broker 305 can be configured to provide for message exchanges between proxy data engine 220 and a data portal 280. Communication to data collection portal 280 can be via cloud 160; data collection portal 280 itself can be implemented within cloud 160. Message broker 305 can also be configured to provide for message exchanges between proxy data engine 220 and both ML server applications 250 and ML server 230. To enable these message exchanges, message broker 305 can be configured to support scalable data transport protocols commonly used for large-scale Internet applications such as HTTP and MQTT.

Data I/O engine 310 can be configured to dynamically launch and manage servlets 320 in response to messages and commands received from data collection portal 280 or according to schedule file 312. Data I/O engine 310, which can also be referred to as a data query engine, receives the messages and commands, interprets them to determine what data is being requested, and issues a request to one or more servlets 320 to collect the requested data. As appropriate, data I/O engine 310 can have new servlets 320 dynamically downloaded to proxy data engine 220 and launched for operation. For example, during operation an operator may decide to request data for a new functional area. In that case, data I/O engine 310 can download a servlet 320 for that functional area and enable collection of data for it. Servlets 320 can be downloaded on demand.

Schedule file 312 can be downloaded by proxy data engine 220 from data collection portal 280, and a copy of schedule file 312 can be stored on proxy data engine 220 for reference by data I/O engine 310. Schedule file 312 specifies the time schedule of the data collection by servlets 320 as well as the rules and conditions that trigger the data collection. Servlets 320 evaluate these conditions by monitoring the applicable data sources. For example, a servlet 320 can monitor a particular data source for a condition specifying an upper or lower threshold value of a data item. Schedule file 312 can be configured to have a format and syntax that can be efficiently evaluated by servlets 320 without significant processing overhead. Configuration file 314 provides a list of servlets 320 that can be launched and used by data I/O engine 310 to capture data items from various data sources.

Servlets 320 are independent and intelligent data agents that serve to collect data from one or more data sources and can be configured to manage a specific set of data items. Servlets 320 can access the data sources via an appropriate data-collection interface, such as a software API. A data source can be any software or hardware entity within an embedded device that makes its status or operational information available for access. In general, a data source corresponds to a particular functional area of the embedded device. Exemplary data sources include physical network interfaces, such as WiFi, Ethernet, or HDMI, and internal processing elements, such as a video encoder/decoder, CPUs, memory interfaces, and thermal meters. In addition, the data items generated by the data sources can be of a wide-range and have different data types. The data sources can also be sampled at different sampling rates depending on the data type and the data requested.

Servlets 320 can be configured to be responsive to various command protocols, such as Representational State Transfer (REST), for data collection and management. Servlets can also be configured to collect and provide data in a push or pull mode. For example, servlets 320 can respond to a data query in a data pull mode, while also providing event-triggered data gathering and transmission to data collection portal 280 in a data push mode. Servlets 320 support real-time data pulling of data and pushing of data and can also provide scheduled bulk data collection in the background.

After collecting data items from the data sources, servlets 230 can perform any necessary data formatting and structuring so that the collected raw data can be transformed into a format that facilitates the transmission to and storage in the data collection portal 280. For instance, servlets 320 can poll multiple data items and construct a composite data type using an appropriate data format. Data formats for formatting and structuring the collected raw data include, for example, JSON and Flatbuffer. In this manner, servlets 320 can perform data pre-processing so that the data is suitable for use by other applications, including ML processing by ML cores 240 using appropriate ML models. Besides collecting the data, servlets 320 can also be configured to provide data privacy protection. For example, to ensure data privacy, servlets 320 can pre-process the data to hide or obscure the original data values.

Servlets 320 can save the collected data in local data cache 324, and message broker 305 communicates with data collection portal 280 in cloud 160 to transfer the collected data from local cache 324 via the appropriate data transport protocol. Local data cache 324 temporarily saves the collected data, such as for later transmission to data collection portal 280. Each servlet 320 identifies the collected data that needs to be locally cached in local data cache 324 and coordinates and controls a schedule for caching the collected data based on various parameters and conditions including, for example, the criticality and variability of the cached data items. Local data cache 324 can be implemented as volatile or non-volatile memory, such as DRAM, flash memory, or a hard disk. Non-volatile memory, like flash memory and hard disks, is used to store data that should survive device restart or crush, such as the detailed status, performance, and operational data.

To make installation of servlets 320 simpler, servlets 320 can be configured as pluggable components. Servlets 320 can also be statically or dynamically loaded and executed. Since memory resources can be scarce in an embedded environment, proxy data engine 220 can include a basic set of essential servlets 320 that are statically compiled. Additional servlets 320 can subsequently be downloaded and loaded at run time, such as when a REST call is made to that particular servlet 320.

Servlets 320 can be deployed dynamically in two ways. First, servlets 320 can be held in a dynamically linked shared library. When a REST call is made to a particular servlet 320, dynamically linked servlets 320 stored in the dynamically linked shared library are loaded. Second, servlets 320 can be compiled as executable files. A REST API can invoke a particular executable servlet 320. Data I/O engine 310 then launches the executable.

Figure 15:
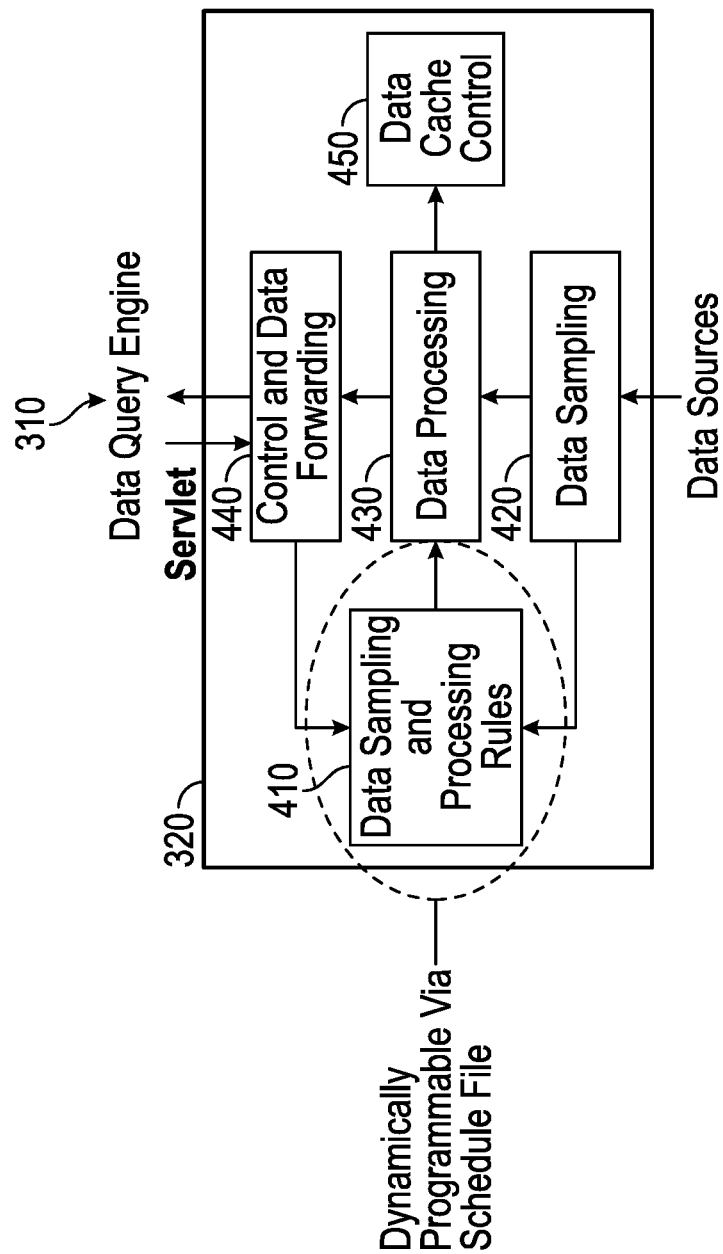
FIG. 15 shows components of a servlet according to some embodiments.

FIG. 15 shows components of a servlet according to some embodiments. As shown in FIG. 15, servlet 320 includes data sampling and processing rules 410, data sampling 420, data processing 430, control and data forwarding 440, and data cache control 450. Data sampling and processing rules 410 interprets the rules, conditions, and messages provided from data I/O (query) engine 310 and from schedule file 312 to determine how servlet 320 should collect data from a particular data source. In accordance with this interpretation, data sampling 420 samples and collects data from the particular data source.

Data processing 430 receives the collected data and performs data reformatting and structuring as appropriate and in accordance with an applicable data format for the data. Data processing 430 also evaluates and determines how and where the collected data should be sent. For example, data processing 430 can determine if the collected data should be provided to data cache control 450 for temporary storage in local data cache 324 or provided to control and data forwarding 440 to provide to data I/O engine 310. For the former, data cache control 450 receives the collected data and coordinates with other servlets 320 to determine how and when to store the collected data in local data cache 324. For the latter, control and data forwarding 440 receives the collected data and provides it to data I/O engine 310, which can provide the collected data to message broker 305 to transmit to data collection portal 280.

Figure 16:
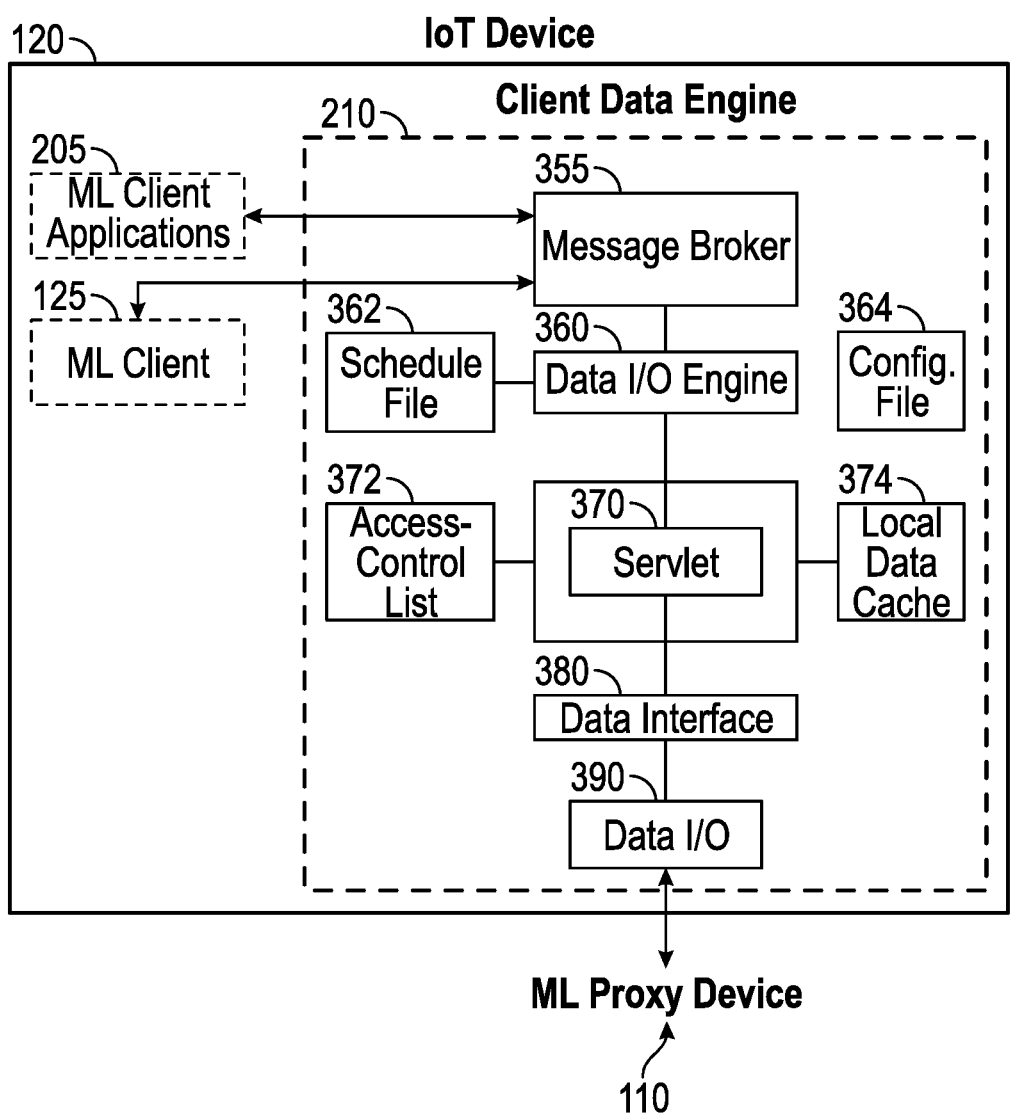
FIG. 16 illustrates exemplary components of a client data engine according to embodiments.

FIG. 16 illustrates exemplary components of a client data engine according to embodiments. As shown in FIG. 16, IoT device 120 includes client data engine 210. Proxy data engine includes a number of components including a message broker 355, a data I/O engine 360, one or more servlets 370, a data interface 380, and a data I/O port 390. Data I/O engine 360 is configured to communicate with a schedule file 362 and a configuration file 364. Servlets 320 are configured to communicate with an access control list 372 and a local data cache 374. Client data engine 210 can be implemented in hardware, software, or a combination thereof and can include one or more processors, such as CPUs or ASICs, one or more memory modules, such as RAM, ROM, hard drives, optical disks, or other storage mediums, and software, such as programs, routines, operating systems, plugins, or applications. Components of client data engine 210 can be configured and implemented in the same manner as corresponding components of proxy data engine 220. Accordingly, description of the components of client data engine 210 can be based on reference to the corresponding components of proxy data engine 220.

Figure 17:
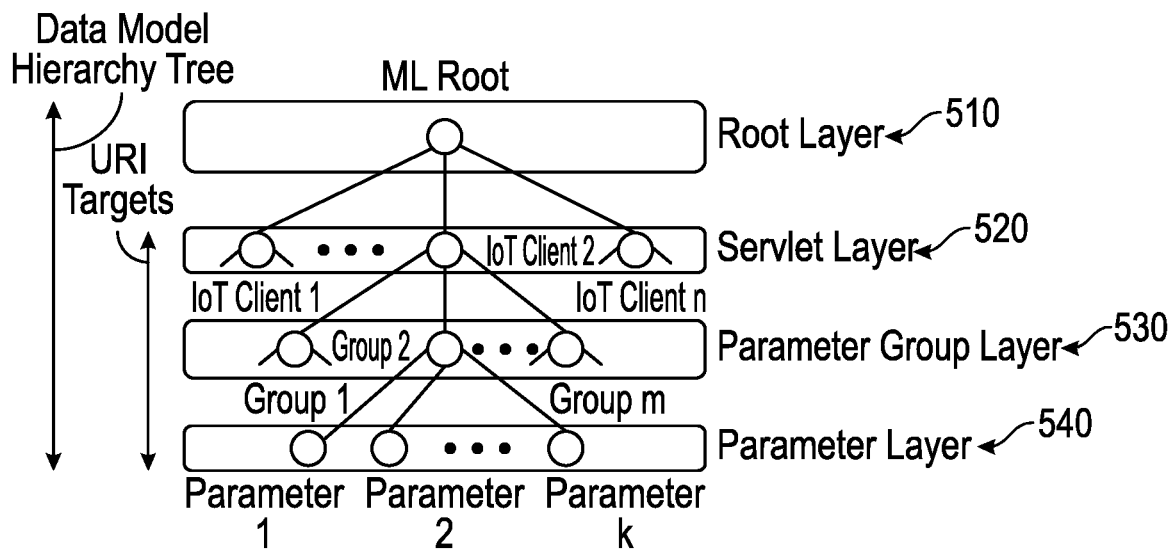
FIG. 17 illustrates an exemplary tree structure according to some embodiments.

To enable servlets 320 to efficiently access the data items in the various data sources, all data items can be organized into a logical hierarchical tree. FIG. 17 illustrates an exemplary tree structure according to some embodiments. As shown in FIG. 17, the tree structure includes four layers: a ML root layer 510, a servlet layer 520, a parameter group layer 530, and a parameter layer 540. Under ML root 510 is servlet layer 520, which corresponds to the groups of data items for which each individual servlet 320 is responsible. Under servlet layer 520 is parameter group layer 530, which corresponds to the specific parameter groups managed by servlets 320. Lastly, under the parameter group layer 530 is the parameter layer 540, which includes all the individual parameters within the groups.

Each individual parameter in parameter layer 540, parameter group in parameter group layer 530, and servlet in servlet layer 520 can be precisely addressed by a Universal Resource Identification (URI) and the data items can be filtered according to common REST commands as are known to those skilled in the art. RESTful data transfer commands have been widely adopted for mass Internet applications and have been proven to be scalable to large-scale data transfers.

URI Target Examples:
- http://192.168.1.100:8888/hdmi?include=txHW
- http://192.168.1.100:8888/wifi/transmitStatics?include=transmitframes+transmitStatusError
- http://192.168.1.100:8888/wifi?exclude=annpduData
- http://192.168.1.100.8888/wifi?spectrumDataTrigger=1
- http://192.168.1.100:8888/wifi/transmitStatistics/transmitframes RESTful commands include certain syntactical terms for accessing data items including, for example, "/" to traverse the hierarchy of the resources and sub resources in the URI. RESTful commands can also include keywords like "include" and "exclude" along with "+" to filter the data access. Servlets 320 filter the data access to collect only the resources that are requested. This reduction in the number of resources requested correspondingly reduces the processing power, memory and network bandwidth used during data collections. By using URI rules to query only the data resources from which data items are sought to be collected, servlets 320 can make the data collection more efficient.

In addition to making data access more efficient, access to data sources can be controlled and regulated. To implement this control, access-control list 322 regulates access to the data sources by servlets 320. In particular, access-control list 322 specifies the data items on the data-model tree that can be accessed on the embedded device by a particular servlet 320. Access-control list 322 can use a syntax, such as JSON or other syntaxes as are known to those skilled in the art, that naturally describes the sub-tree or access level for data items accessible to a particular servlet 320.

Figure 18:
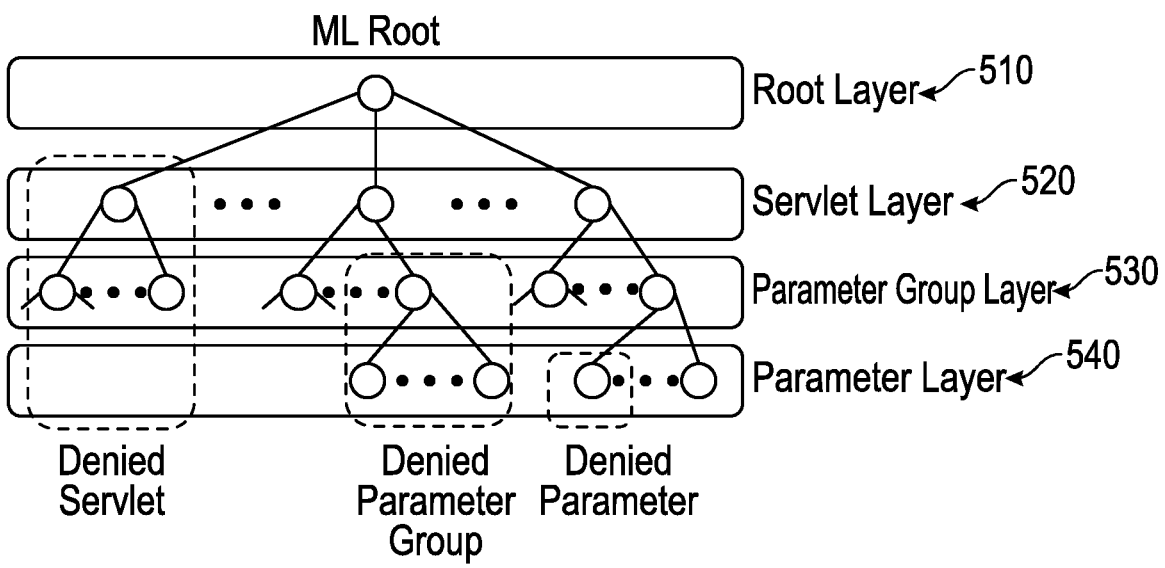
FIG. 18 illustrates an exemplary tree structure according to some embodiments based on access defined by an access-control list.

The sub-tree represents all accessible data items among all those on the entire data-model tree structure, such as shown in FIG. 18. FIG. 18 illustrates an exemplary tree structure according to some embodiments based on access defined by an access-control list. Servlets 320 check all data collection requests against access-control list 322 and proceed with the data collection if and only if the requested data items are part of the specified accessible sub-tree. As shown in the example of FIG. 18, access-control list 322 can deny a servlet 320 access to all parameter groups of a particular functional unit of an embedded device, deny a servlet 320 access to a particular parameter group, or deny a servlet 320 access to a particular parameter within a parameter group.

Figure 19:
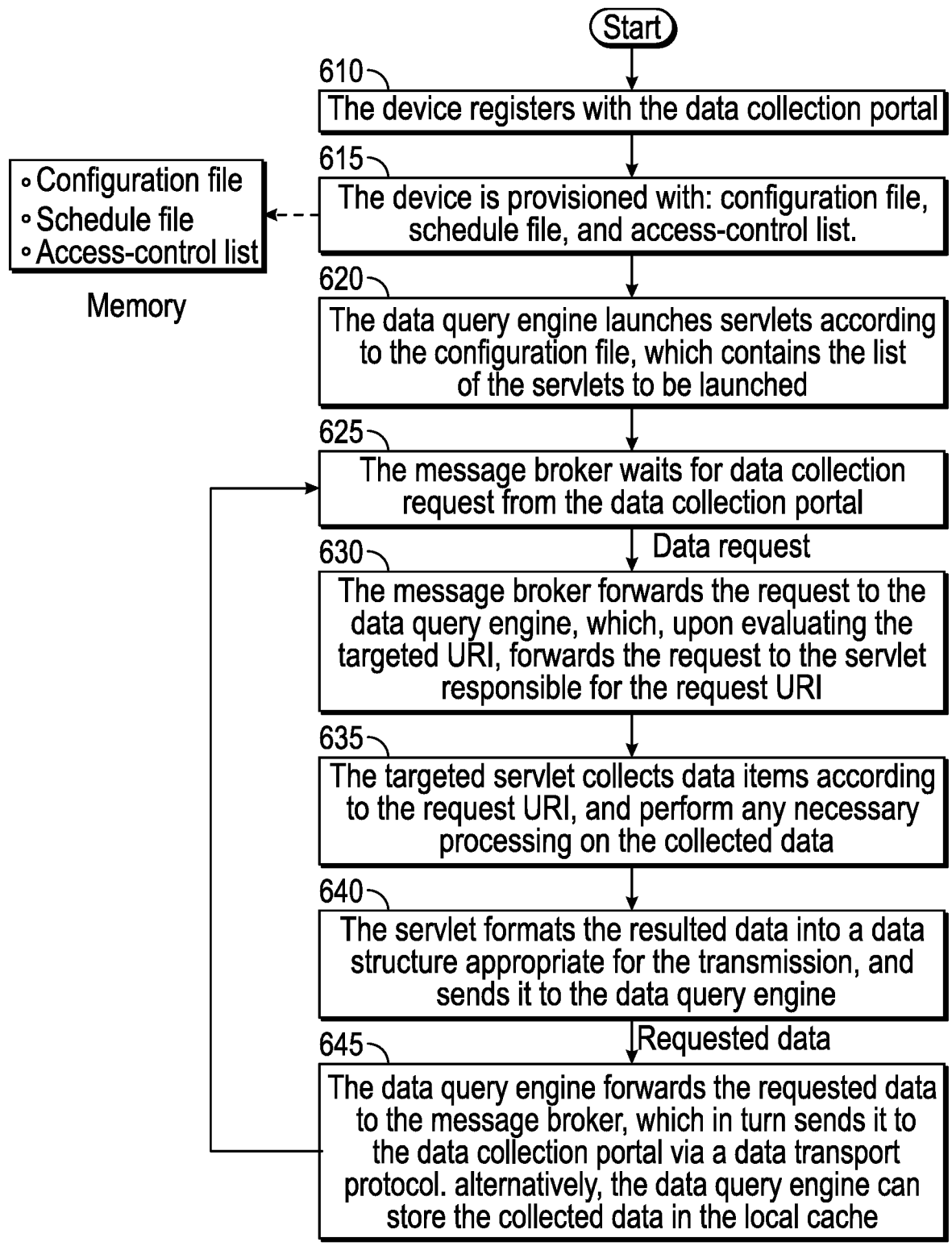
FIG. 19 shows a flow chart of a process for an immediate data query in a pull mode according to some embodiments.

FIG. 19 shows a flow chart of a process for an immediate data query in a pull mode according to some embodiments. As shown in FIG. 19, ML proxy device 110, IoT device 120, or other embedded device can register with data collection portal 280 (step 610). To register with data collection portal 280, proxy data engine 220 or client data engine 210 can have message broker 305/355 send a message requesting registration to data collection portal 280. In response, data collection portal 280 provides a schedule file 312/362, configuration file 314/364, and access-control file 322/372 to proxy data engine 220 or client data engine 210 (step 615). The received files can be stored in a non-volatile memory within the receiving device.

Data I/O (query) engine 310/360 uses configuration file 314/364 to launch servlets 320 for use in collecting data from various data sources (step 620). Data I/O engine 310/360 can also dynamically launch servlets 320 depending upon the data being requested and the servlets 320 already launched. Once servlets 320 have been launched, message broker 305/355 awaits a data request or query from data collection portal 280 (step 625). Message broker 305/355 can receive the data request via cloud 160.

In response to receiving a data request from data collection portal 280, message broker 305/355 forwards the request to data I/O (query) engine 310/360 (step 630). Data I/O engine 310/360 evaluates the data request, determines the targeted URI corresponding to the data requests, identifies the servlet 320 responsible for processing the request corresponding to the determined URI, and forwards the request to that servlet 320. That servlet 320 then collects the data items from the data source according to the determined URI (step 635). The data items collected by servlet 320 are processed and determined in accordance with the filtering and conditions set forth in the data request.

In addition to collecting the data items, servlet 320 formats the resulting data into an appropriate data structure for transmission to data collection portal 280 and forwards the formatted data to data I/O engine 310/360 (step 640). Data I/O engine 310/360 then provides the formatted data to message broker 305/355, which sends the data to data collection portal 280 using an applicable data transport protocol (step 645).

Figure 20:
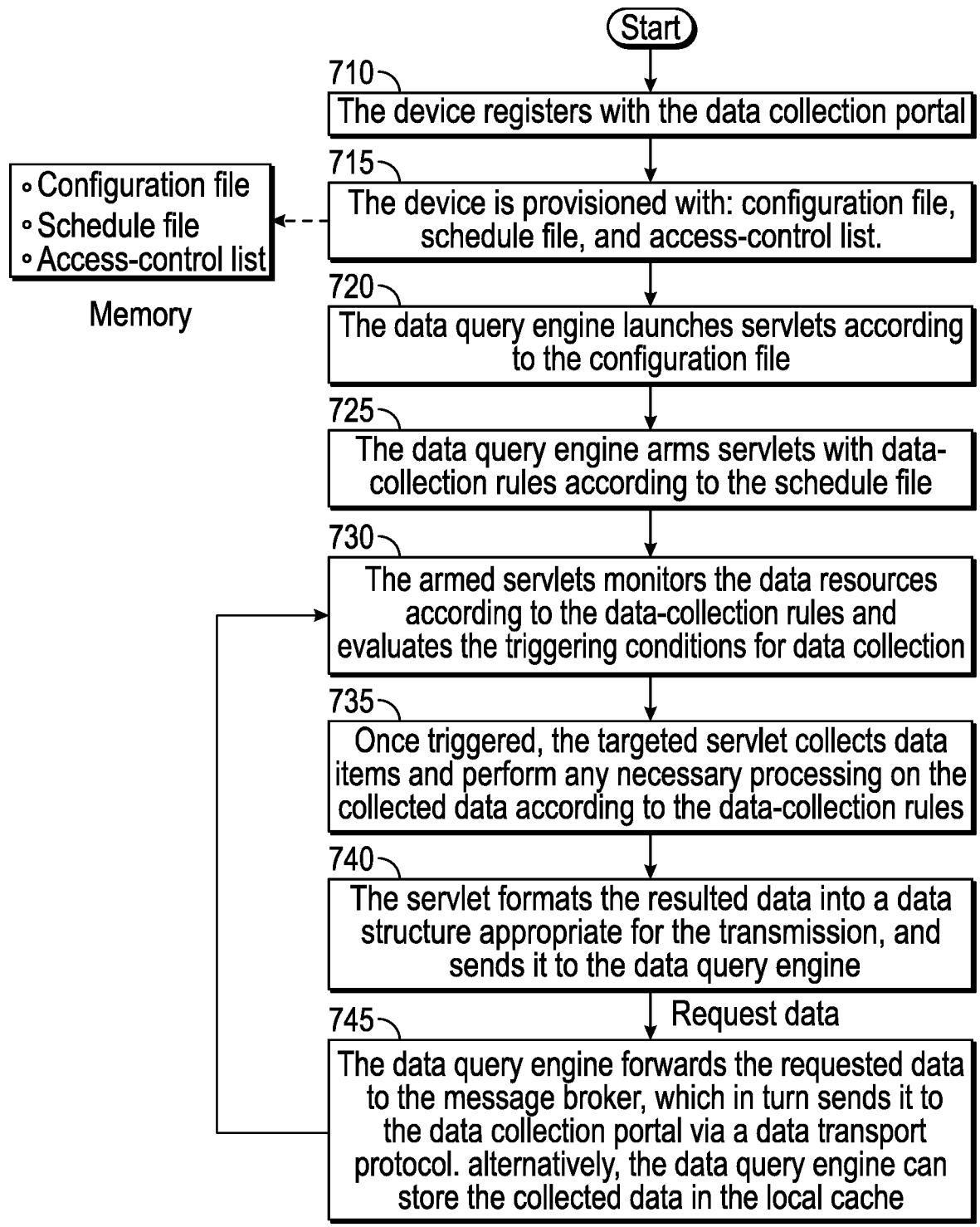
FIG. 20 shows a flow chart of a process for an immediate data query in a push mode according to some embodiments.

FIG. 20 shows a flow chart of a process for an immediate data query in a push mode according to some embodiments. Initial steps in the push mode are the same as in the pull model shown in FIG. 19. In particular, as shown in FIG. 20, ML proxy device 110, IoT device 120, or other embedded device can register with data collection portal 280 (step 710). In response, data collection portal 280 provides a schedule file 312/362, configuration file 314/364, and access-control file 322/372 to proxy data engine 220 or client data engine 210 (step 715). Moreover, data I/O (query) engine 310/360 uses configuration file 314/364 to launch servlets 320 for use in collecting data from various data sources (step 720). At this point, the push mode diverges from the pull mode.

Having launched the servlets 320 based on configuration file 314/364, data I/O (query) engine 310/360 establishes and sets rules and conditions provided in schedule file 312/362 to be used by servlets 320 when collecting data from the various data sources (step 725). Instead of waiting for a data request from data collection portal 280, servlets 320 monitor the data sources according to the rules and conditions set therein and determine when the data items from those data sources trigger action by the servlets 320 according to those rules and conditions (step 730). When triggered, the servlets collect the data items satisfying the rules and conditions and process and filter them as appropriate (step 735).

The final steps of the push mode then follow the same processing as that of the pull mode. In particular, servlets 320 format the resulting data into an appropriate data structure for transmission to data collection portal 280 and forward the formatted data to data I/O engine 310/360 (step 740). Data I/O engine 310/360 then provides the formatted data to message broker 305/355, which sends the data to data collection portal 280 using an applicable data transport protocol (step 745).

The use of servlets 320 to collect data and the surrounding components for activating servlets and transmitting the collected data enables massive amounts of data to be collected and targeted in an efficient and directed manner. This use can be coordinated with the ML processing of ML proxy device 110 to serve as a source of the massive amounts of data and make the ML processing more useful and accurate. Data collection portal 280 facilitates this activity by providing the collected data to ML proxy device 110, such as via cloud 160 or other networked communication system.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

The invention claimed is:

1. A machine-learning (ML) proxy device providing ML processing for one or more ML applications operating on one or more Internet of Things (IoT) devices, the ML proxy device configured to:
at one or more processors:
receive an ML request from an IoT device, the ML request being generated by an ML application operating on the IoT device and including first input data collected by the ML application;
receive second input data from one or more transmitted servlets, wherein the one or more transmitted servlets are dynamically allocated according to ML data collection requirements of the ML application operating on the IoT device;
receive, from a configuration device external to the ML proxy device and the IoT device, a configuration file;
identify, based on the configuration file, an ML model to perform ML processing of the first input data and the second input data;
provide the ML model, the first input data, and the second input data to a ML core for ML processing;
receive ML processing output data from the ML core as a result of ML processing by the ML core of the first input data and the second input data using the ML model; and
transmit the ML processing output data to the IoT device.

2. The ML proxy device of claim 1, wherein the one or more processors is further configured to:
transmit one or more servlets to collect data from one or more data sources; and
provide the ML core the collected data from the one or more servlets for the ML processing.

3. The ML proxy device of claim 1, wherein the one or more processors is further configured to convert the first input data collected by the ML application into a format used by the ML core.

4. The ML proxy device of claim 1, wherein the one or more processors is further configured to:
receive a plurality of ML requests from one or more IoT devices;
generate a schedule for ML processing of the plurality of ML requests based on priority queues; and
perform ML processing by one or more ML cores of the plurality of ML requests according to the priority queues.

5. The ML proxy device of claim 4, wherein the one or more processors is further configured to:
assign at least one of the plurality of ML requests to a session in the generated schedule; and
complete all of the ML processing for the ML request assigned to the session when the ML core begins the ML processing of that ML request according to the generated schedule.

6. The ML proxy device of claim 4, wherein the one or more processors is further configured to:
assign at least one of the plurality of ML requests to at least first and second segments in the generated schedule; and
perform ML processing by an ML core of at least one other ML request between the ML processing of the first and second segments by the ML core according to the generated schedule.

7. The ML proxy device of claim 4, wherein:
each of the plurality of ML requests includes indicating priority information for processing the ML request, and
the one or more processors is further configured to generate the schedule for ML processing of the plurality of ML requests based on the priority information.

8. The ML proxy device of claim 1, wherein the one or more processors is further configured to:
communicate with the IoT device using data transport protocol; and
bridge the communication with the IoT device with an IoT adaptor when the IoT device does not support the data transport protocol.

9. The ML proxy device of claim 1, wherein the one or more processors is further configured to progressively pre-compile the ML model into specific binary codes of the ML core during a downloading the ML model to the ML proxy device.

10. The ML proxy device of claim 1, wherein the ML application collects data in accordance with information provided by the configuration device.

11. The ML proxy device of claim 1, wherein the configuration device is separate from the IoT device.

12. The ML proxy device of claim 1, wherein the one or more processors is further configured to responsive to a data request, determine the one or more servlets responsible for processing the data request.

13. The ML proxy device of claim 1, wherein:
the one or more transmitted servlets configured with data access control rules, and
the one or more transmitted servlets are configured to collect the first input data generated by ML application operating on the IoT device only if the data access control rules provide permission to make the collection.

14. A method for providing machine-learning (ML) processing for one or more ML applications operating on one or more Internet of Things (IoT) devices, the method comprising, by an ML proxy device:
receiving an ML request from an IoT device, the ML request being generated by an ML application operating on the IoT device and including first input data collected by the ML application;
transmitting one or more servlets configured with data access control rules, wherein the one or more servlets are further configured to collect second input data generated by the ML application in response to the data access control rules providing permission to make the collection;
receiving, from a configuration device external to the ML proxy device and the IoT device, a configuration file;
identifying, based on the configuration file, an ML model to perform ML processing of the input data;
providing the ML model, the first input data, and the second input data to a ML core for ML processing;
receiving ML processing output data from the ML core as a result of ML processing by the ML core of the first input data and the second input data using the ML model; and transmitting the ML processing output data to the IoT device.

15. The method of claim 14, the method further comprising:
   transmitting one or more servlets to collect data from one or more data sources; and
   providing the ML core the collected data from the one or more servlets for the ML processing.

16. The method of claim 14, the method further comprising:
   receiving a plurality of ML requests from one or more IoT devices at the ML proxy device;
   generating a schedule for ML processing of the plurality of ML requests; and
   performing ML processing by one or more ML cores of the plurality of ML requests according to the generated schedule.

17. A non-transitory, computer-readable medium storing instructions that, when executed by a machine-learning (ML) proxy device providing ML processing for one or more ML applications operating on one or more Internet of Things (IoT) devices, control the ML proxy device to implement a method comprising:
   receiving an ML request from an IoT device, the ML request being generated by an ML application operating on the IoT device and including first input data collected by the ML application;
   receiving second input data from one or more transmitted servlets, wherein the one or more transmitted servlets are dynamically allocated according to ML data collection requirements of the ML application operating on the IoT device;
   receiving, from a configuration device external to the ML proxy device and the IoT device, a configuration file;
   identifying, based on the configuration file, an ML model to perform ML processing of the input data;
   providing the ML model, the input data, and the second input data to a ML core for ML processing;
   receiving ML processing output data from the ML core as a result of ML processing by the ML core of the first input data and the second input data using the ML model; and
   transmitting the ML processing output data to the IoT device.

18. The non-transitory, computer-readable medium of claim 17, the method further comprising:
   transmitting the one or more servlets to collect data from one or more data sources; and
   providing the ML core the collected data from the one or more servlets for the ML processing.

19. The non-transitory, computer-readable medium of claim 17, the method further comprising:
   receiving a plurality of ML requests from one or more IoT devices at the ML proxy device;
   generating a schedule for ML processing of the plurality of ML requests based on priority queues; and
   performing ML processing by one or more ML cores of the plurality of ML requests according to the priority queues.

* * * * *